(12) United States Patent
Kenoyer

(10) Patent No.: US 8,125,509 B2
(45) Date of Patent: Feb. 28, 2012

(54) FACIAL RECOGNITION FOR A VIDEOCONFERENCE

(75) Inventor: Michael L. Kenoyer, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1441 days.

(21) Appl. No.: 11/625,028

(22) Filed: Jan. 19, 2007

(65) Prior Publication Data

US 2007/0188597 A1      Aug. 16, 2007

Related U.S. Application Data

(60) Provisional application No. 60/761,867, filed on Jan. 24, 2006.

(51) Int. Cl.
*H04N 7/14* (2006.01)

(52) U.S. Cl. ............... 348/14.08; 348/14.09; 348/14.12

(58) Field of Classification Search ..... 348/14.01–14.16; 370/260–261; 382/118; 709/204–205; 715/753, 715/755, 751
See application file for complete search history.

(56) References Cited

U.S. PATENT DOCUMENTS

| | | | |
|---|---|---|---|
| 5,617,539 A | 4/1997 | Ludwig et al. | |
| 5,649,055 A | 7/1997 | Gupta et al. | |
| 5,689,641 A | 11/1997 | Ludwig et al. | |
| 5,751,338 A | 5/1998 | Ludwig, Jr. | |
| 6,173,069 B1 | 1/2001 | Daly et al. | |
| 6,301,370 B1 | 10/2001 | Steffens et al. | |
| 6,400,996 B1 | 6/2002 | Hoffberg et al. | |
| 6,594,688 B2 | 7/2003 | Ludwig et al. | |
| 6,816,904 B1 | 11/2004 | Ludwig et al. | |
| 7,130,446 B2 | 10/2006 | Rui et al. | |
| 7,475,112 B2 * | 1/2009 | Sinclair et al. | 709/204 |
| 2001/0055058 A1 * | 12/2001 | Milovanovic et al. | 348/14.01 |
| 2005/0054352 A1 * | 3/2005 | Karaizman | 455/456.3 |
| 2005/0280502 A1 * | 12/2005 | Bell | 340/5.83 |
| 2007/0140532 A1 * | 6/2007 | Goffin | 382/118 |
| 2007/0188596 A1 | 8/2007 | Kenoyer | |
| 2007/0188598 A1 | 8/2007 | Kenoyer | |

FOREIGN PATENT DOCUMENTS

JP      2000312350 A   * 11/2000

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

(Continued)

*Primary Examiner* — Melur Ramakrishnaiah
(74) *Attorney, Agent, or Firm* — Meyertons Hood Kivlin Kowert & Goetzel, P.C.; Jeffrey C. Hood; Jason L. Burgess

(57) ABSTRACT

A facial recognition algorithm may be performed in order to identify a participant at a first endpoint in a videoconference. Participant information for the participant may be displayed together with an image of the participant on a display screen at a second endpoint in the videoconference. Displaying the participant information for the participant on the display screen may enable participants at the second endpoint to see the participant information for the participant during the videoconference.

21 Claims, 19 Drawing Sheets

OTHER PUBLICATIONS

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001; 26 pages.

"Polycom Executive Collection"; Jun. 2003; 4 pages; Polycom, Inc.; Pleasanton, CA.

Ira M. Weinstein; "Security for Videoconferencing: A guide to understanding, planning, and implementing secure compliant ISDN & IP videoconferencing solutions"; Jan.-Feb. 2004; 16 pages; Wainhouse Research.

E. J. Addeo, A.D. Gelman and A.B. Dayao; "Personal Multi-media Multi-point Communication Services for Broadband Networks", Global Telecommunications Conference and Exhibition; Nov.-Dec. 1988 pp. 53-57; vol. 1.

* cited by examiner

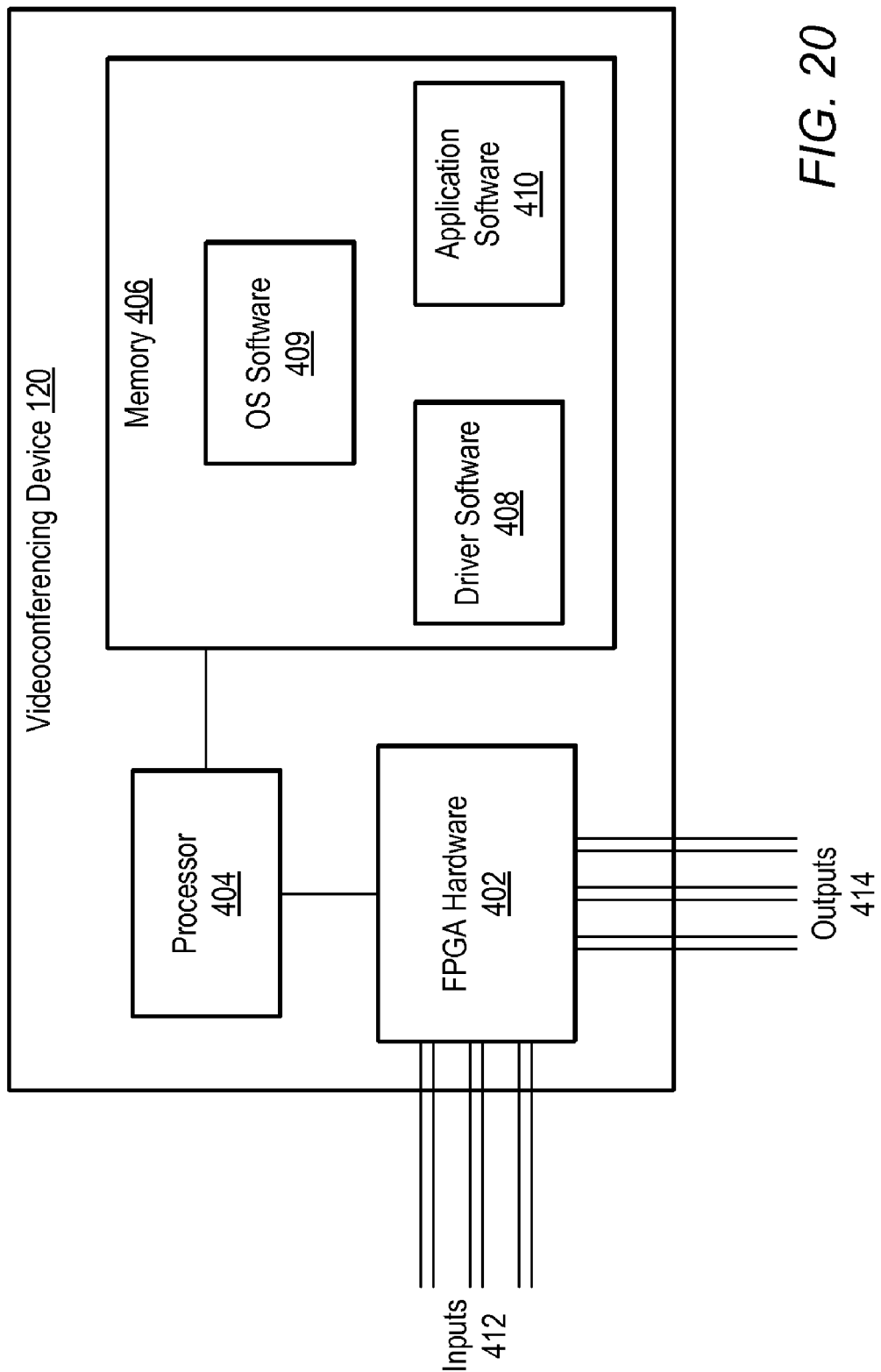

FACIAL RECOGNITION FOR A VIDEOCONFERENCE

This application claims priority to U.S. Provisional Patent Application Ser. No. 60/761,867, titled "Shared Conference Participant Data", which was filed Jan. 24, 2006, whose inventor was Michael L. Kenoyer.

BACKGROUND OF THE INVENTION

1. Field of the Invention

The present invention relates to videoconferences and videoconferencing systems.

2. Description of the Related Art

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from a remote participant. Each videoconferencing system may also have a computer system to allow additional functionality into the videoconference. For example, additional functionality may include data conferencing (including displaying and/or modifying a document for both participants during the conference).

SUMMARY

Various embodiments of a method for displaying information in a videoconference are disclosed. According to some embodiments, video information including a facial image of a first participant at a first endpoint in a videoconference may be received. The video information may be displayed on a display screen at a second endpoint in the videoconference. The video information may be analyzed to locate the facial image of the first participant, and a facial recognition algorithm may be performed to identify the first participant based on the facial image of the first participant.

The method may further comprise determining first participant information for the first participant in response to identifying the first participant and displaying the first participant information for the first participant on the display screen at the second endpoint in the videoconference. Displaying the first participant information for the first participant on the display screen at the second endpoint in the videoconference may enable participants at the second endpoint in the videoconference to see the first participant information for the first participant during the videoconference.

BRIEF DESCRIPTION OF THE DRAWINGS

A better understanding of the present invention may be obtained when the following detailed description is considered in conjunction with the following drawings, in which:

FIG. 20 illustrates components in an exemplary videoconferencing device according to an embodiment.

Figure 1:
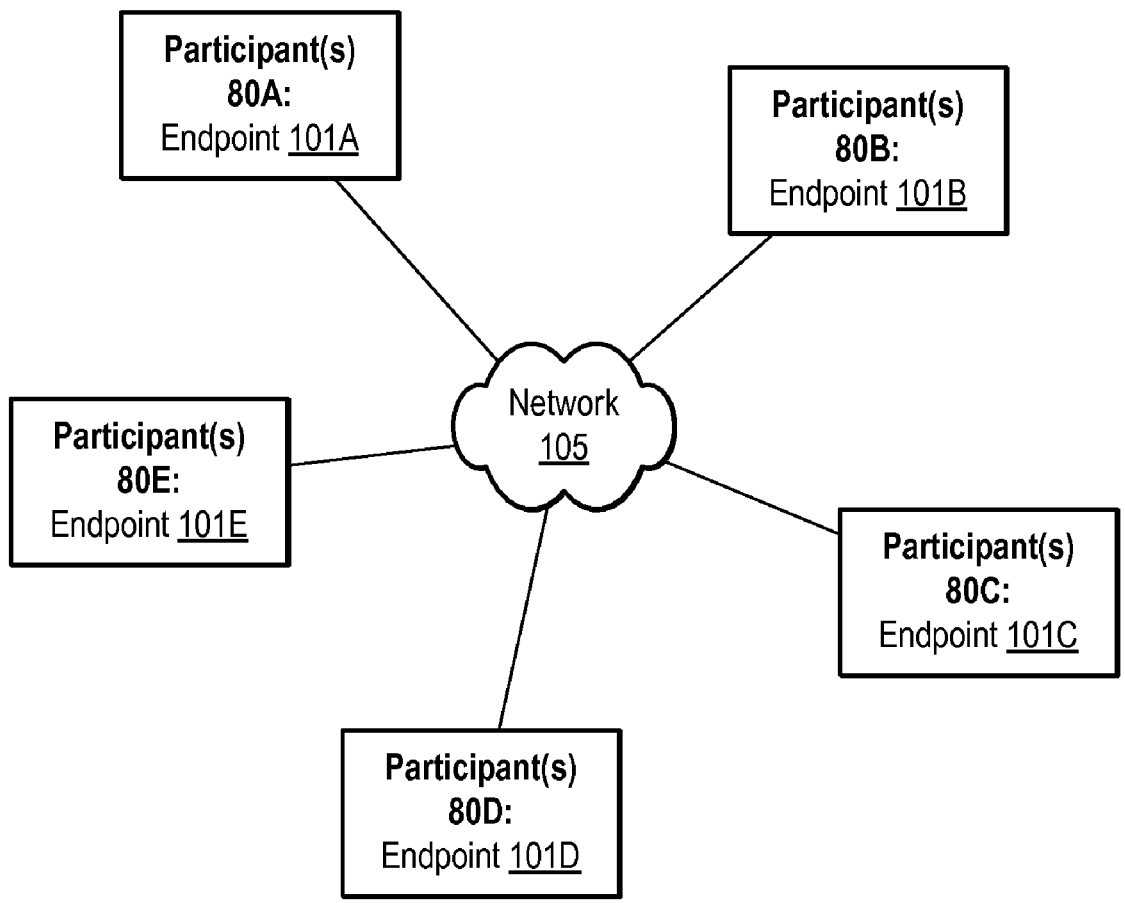
FIG. 1 is a diagram illustrating an embodiment of a videoconference.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Incorporation by Reference

U.S. Provisional Patent Application Ser. No. 60/761,867, titled "Shared Conference Participant Data", which was filed Jan. 24, 2006, whose inventor was Michael L. Kenoyer, is hereby incorporated by reference in its entirety as though fully and completely set forth herein.

U.S. Provisional Patent Application Ser. No. 60/676,918, titled "Audio and Video Conferencing", which was filed May 2, 2005, whose inventors were Michael L. Kenoyer, Wayne Mock, and Patrick D. Vanderwilt, is hereby incorporated by reference in its entirety as though fully and completely set forth herein.

U.S. patent application Ser. No. 11/252,238, titled "Video Conferencing System Transcoder", which was filed Oct. 17, 2005, whose inventors were Michael L. Kenoyer and Michael V. Jenkins, is hereby incorporated by reference in its entirety as though fully and completely set forth herein.

U.S. patent application Ser. No. 11/251,084, titled "Speakerphone", which was filed Oct. 14, 2005, whose inventor was William V. Oxford, is hereby incorporated by reference in its entirety as though fully and completely set forth herein.

U.S. patent application Ser. No. 11/251,086, titled "Speakerphone Supporting Video and Audio Features", which was filed Oct. 14, 2005, whose inventors were Michael L. Kenoyer, Craig B. Malloy and Wayne E. Mock, is hereby incorporated by reference in its entirety as though fully and completely set forth herein.

U.S. patent application Ser. No. 11/251,083, titled "High Definition Camera Pan Tilt Mechanism", which was filed Oct. 14, 2005, whose inventors were Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

U.S. patent application Ser. No. 11/404,582, titled "Background Call Validation", which was filed Apr. 14, 2006, whose inventors were Michael L. Kenoyer and Jonathan W. Tracey, is hereby incorporated by reference in its entirety as though fully and completely set forth herein.

U.S. patent application Ser. No. 11/404,583, titled "Coordinated Camera Pan Tilt Mechanism", which was filed Apr. 14, 2006, whose inventors were Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 is a diagram illustrating an embodiment of a videoconference. As used herein, the term "videoconference" refers to a conference between participants at two or more locations, with video information sent from at least one of the locations to one or more of the other locations. For example, the video information sent from a given location may represent a live video stream (video signal) received from a camera or other video source, where the video information is received by the other locations and used to reproduce the live video stream on a display device, such as a television or computer monitor. In addition to video information, audio information may also be sent from at least one of the locations to one or more of the other locations.

In some embodiments, videoconferencing systems may allow people at two or more different locations to participate in a conference so that the people at each location can see and hear the people at the other location(s). The videoconferencing systems may perform digital compression of audio and video signals in real time. The hardware or software that performs compression may be referred to as a codec (coder/decoder). The resulting digital stream of bits representing the audio and video data may be subdivided into packets, which may be transmitted through a network (e.g., an integrated services digital network (ISDN) or using Internet Protocol (IP)) to the other locations or endpoints participating in the videoconference.

In some embodiments, videoconferences may be performed, for example, using videoconferencing equipment that may be especially designed for the videoconference. In some embodiments, the videoconferencing equipment may be incorporated into other devices (e.g., a general purpose personal computer (PC)). For example, a typical desktop PC may be configured to add-on hardware boards and/or software to enable the PC to participate in a videoconference. In some embodiments, the videoconferencing device may include input ports for receiving video signals from local video sources and audio signals from local microphones. The videoconferencing device may also include network ports for receiving the remote audio/video streams from and sending the local audio/video stream to the remote endpoints. The videoconferencing device may also include output ports for displaying the video data on a display device and sending the audio data to an audio output device. The videoconferencing device may also include specialized software and hardware for compressing and decompressing audiovisual data, generating a composite image of the video streams from the various participants, etc. The videoconferencing device may also include an interface to allow users to interact with the videoconferencing equipment, e.g., to pan, tilt, and zoom cameras, select a video input source to send to the remote endpoints, control volume levels, control placement of video windows on the display device, etc.

Various standards may be used to enable the videoconferencing devices at each endpoint to communicate with each other. For example, the International Telecommunications Union (ITU) has specified various videoconferencing standards. These standards include:

H.320—This standard may be used for public switched telephone networks (PSTN) or videoconferencing over ISDN basic rate interface (BRI) or primary rate interface (PRI). H.320 may also be used on dedicated networks such as T1 and satellite-based networks.

H.323—This standard may be used for video over Internet Protocol (IP). This standard may also be used for voice over IP (VoIP).

H.324—This standard may be used for transmission over POTS (Plain Old Telephone Service), or audio telephony networks.

In some embodiments, IP-based videoconferencing may be used as a communications interface and standard for videoconferencing equipment. The Internet, and especially broadband, may facilitate the use of H.323 IP-based videoconferencing. H.323 may be accessible to users over a high speed Internet connection, such as a Digital Subscriber Line (DSL) connection, cable modem connection, or other high-speed connection.

The various locations of the videoconference participants are referred to herein as "endpoints" in the videoconference. For example, FIG. 1 illustrates an exemplary videoconference in which participants 80A-80E are located at respective endpoints 101A-101E. The term "remote endpoint" is relative to a given endpoint in the videoconference and refers to the other endpoints in the videoconference. For example, endpoints 101B-101E may be remote endpoints with respect to endpoint 101A, while endpoints 101A-101D may be remote endpoints with respect to endpoint 101E.

Although there are five endpoints 101 in the embodiment illustrated in FIG. 1, in other embodiments there may be other numbers of endpoints (as long as there are at least two). Also, the participants 80 at a given endpoint 101 may include various numbers of people. In some embodiments, each endpoint 101 may include at least one person as a participant 80. In some embodiments, one or more of the endpoints 101 may not have people present as participants 80. For example, video information from a camera stationed at an endpoint 101A with no participants 80 may be sent to other endpoints 101 and viewed by participants 80 at the other endpoints 101 (the other endpoints 101 may also share video information among each other).

In some embodiments, the endpoints 101 may send video information to all of the remote endpoints 101. In some embodiments, one or more of the endpoints may send video information to only a subset, but not all, of the remote endpoints. As an embodiment, endpoints 101B-101E may each send video information only to endpoint 101A, and endpoint 101A may send video information to each of the endpoints 101B-101E. In some embodiments, each endpoint 101 may send video information to a Multipoint Control Unit (MCU). The MCU may relay the received video information to the various endpoints 101. The MCU may be located at one of the endpoints 101 or may be in a separate location from the endpoints 101.

In some embodiments, one or more of the endpoints 101 may not send video information to a remote endpoint. As an embodiment, a given endpoint 101 may receive video information from one or more of the remote endpoints, but may not send video information to a remote endpoint. In some embodiments, a given endpoint 101 may not send video information to a remote endpoint or receive video information from a remote endpoint. In this embodiment, the given endpoint 101 may participate in the videoconference by sharing audio information only, e.g., may receive audio information from one or more of the remote endpoints, as well as possibly sending audio information to one or more of the remote endpoints.

As noted above, in addition to sharing video information, the endpoints 101 may also share audio information. In some embodiments, each endpoint 101 that sends video information to one or more remote endpoints may also send audio information to the one or more remote endpoints 101. In some embodiments, each endpoint 101 may receive both video information and audio information from the other endpoints 101. In some embodiments, one or more of the endpoints 101 may send video information to one or more remote endpoints, but without sending audio information to the one or more remote endpoints. In some embodiments, one or more of the endpoints 101 may send audio information to one or more remote endpoints, but without sending video information to the one or more remote endpoints.

It will be appreciated that many other possible embodiments of sending video and/or audio information among the various endpoints 101 are also possible.

As noted above, in some embodiments, a Multipoint Control Unit (MCU) may be used to facilitate sharing video and audio information among the endpoints 101. The MCU may act as a bridge that interconnects calls from several endpoints. For example, the endpoints 101 may call the MCU, or the MCU may call the endpoints 101 that are going to participate in the videoconference. The MCU may be located at one of the endpoints 101 of the videoconference or may be in a separate location from an endpoint 101. In some embodiments, the MCU may be embedded in a videoconferencing device at one of the endpoints 101.

The various endpoints 101 in the videoconference may be coupled to each other through a network 105 and may exchange data with each other via the network 105. More particularly, videoconferencing devices located at the various endpoints 101 may be coupled to each other through the network 105. In various embodiments, the videoconferencing devices may communicate with each other through the network 105 using various communication protocols. In some embodiments, the videoconferencing devices may communicate using an IP-based protocol or other packet-based communication protocol.

In various embodiments, the network 105 may include various types of networks or combinations of networks. For example, the network 105 may include various types or combinations of computer networks, data networks, or telephonic networks. Embodiments of computer networks include local area networks (LAN), wide area networks (WAN), an Intranet, the Internet, etc. Exemplary local area networks include Ethernet networks, Fiber Distributed Data Interface (FDDI) networks, and token ring networks. Also, the videoconferencing devices may be coupled to the network 105 using various types of wired or wireless connection mediums. For example, wired mediums may include Ethernet, fiber channel, ISDN connection, etc. Wireless connection mediums may include a satellite link, a modem link through a cellular service, a wireless link such as Wi-Fi™, a wireless connection using a wireless communication protocol such as IEEE 802.11 (wireless Ethernet), etc.

Figure 2:
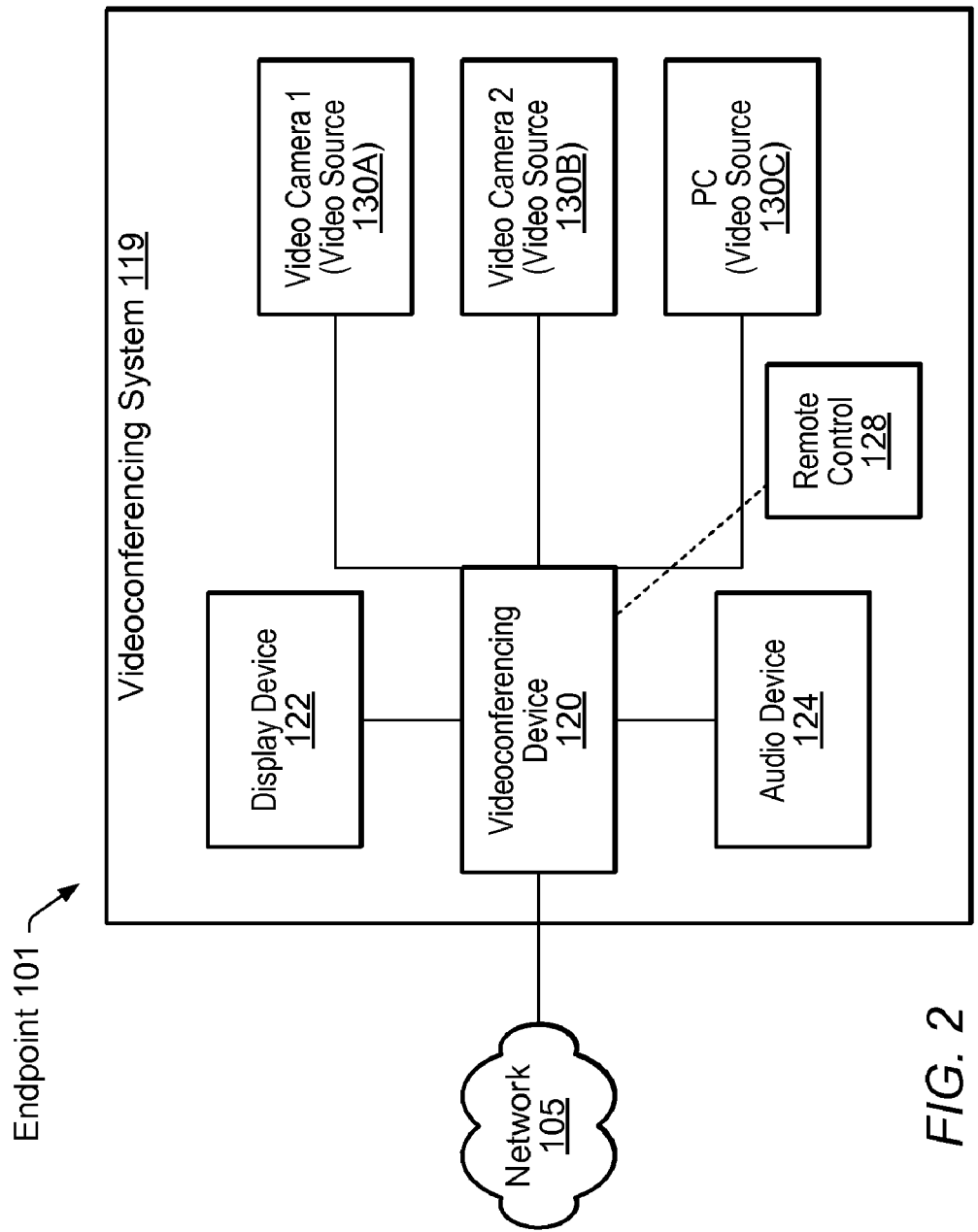
FIG. 2 illustrates an embodiment of a videoconferencing system including a videoconferencing device.

FIG. 2 illustrates an embodiment of an exemplary videoconferencing system 119 that may be utilized by an endpoint 101 in the videoconference. As shown, the videoconferencing system 119 may include a videoconferencing device 120. As used herein, the term "videoconferencing device" refers to a device operable to receive video information from and send video information to remote endpoints in a videoconference (e.g., directly or through an MCU). A videoconferencing device may also receive audio information from and send audio information to the remote endpoints.

In some embodiments, the videoconferencing device 120 may receive a plurality of video input signals from a plurality of video sources 130, e.g., via inputs on the videoconferencing device 120. In various embodiments, a video source 130 may include various kinds of devices operable to produce a video signal. In some embodiments, the video sources 130 may include two video cameras and a personal computer (PC), e.g., where the PC provides a video signal through a video card. Other embodiments of possible video sources 130 include a Digital Versatile Disc (DVD) player, a Videocassette Recorder (VCR), or other device operable to produce a video signal. In various embodiments, the videoconferencing device 120 may receive respective video input signals from various numbers of video sources 130. The videoconferencing device 120 may be operable to select one (or more) of the video input signals received from the video sources 130 as a video input signal to send to one or more of the remote endpoints in the videoconference.

As shown, the videoconferencing device 120 may be coupled to the network 105. The videoconferencing device 120 may send the selected local video input signal to the remote endpoints 101 via the network 105. The videoconferencing device 120 may also receive video signals from the remote endpoints 101 via the network 105. The video signals received from the remote endpoints 101 are also referred to herein as "remote video signals".

As used herein, the term "video signal" or "video input signal" refers to various kinds of information useable to display video and does not imply that the information is in a particular form or encoded in a particular way. For example, in various embodiments, the local video signal from a local video source may be sent from an endpoint 101 to the remote endpoints 101 in various forms and using various communication protocols or standards. In some embodiments, the local video signal may be sent to the remote endpoints 101 as digital information, e.g., as ordered packets of information. Similarly, in some embodiments, the remote video signals may be received over the network 105 in a digital form, e.g., as ordered packets of information.

Thus, if the local video source originally produces an analog signal, then the signal may be converted into digital information, or if the local video source originally produces a digital signal, the signal may be encoded in a different way or packetized in various ways. Thus, the video information that originates from a given video source 130 may be encoded, decoded, or converted into other forms at various stages between leaving the video source and arriving at the remote endpoints (possibly multiple times). The term "video signal" is intended to encompass the video information in various forms.

Referring again to FIG. 2, the videoconferencing system 119 at the endpoint 101 may also include one or more display devices 122 to which the videoconferencing device 120 provides an output signal via an output port. The display device 122 may include various kinds of devices operable to display video information, such as a television, computer monitor, LCD screen, projector, or other device.

In some embodiments, the videoconferencing device 120 may be operable to display a graphical user interface (GUI) on the display device 122, where the user (e.g., the operator of the videoconferencing device 120) can interact with the GUI to provide input to the videoconferencing device 120, e.g., similar to the manner in which users commonly provide input to computer systems or on-screen television displays to set various options or perform various functions. For example, the user may operate the remote control device 128 or other input device (such as a keyboard or buttons on the videoconferencing device 120 chassis) to request the videoconferencing device 120 to perform a particular operation. In response, the videoconferencing device 120 may display various GUI elements on the display device 122, e.g., where the GUI elements may indicate various options or functions related to the requested operation. The user may scroll to and select a desired GUI element.

In some embodiments, the videoconferencing system 119 may include multiple display devices 122. The videoconferencing device 120 may be configured to distribute multiple output video signals across the multiple display devices 122.

As shown, the videoconferencing device 120 may also couple to one or more audio devices 124. For example, the audio device(s) 124 may include one or more microphones or other audio input devices for providing local audio input to be sent to the remote endpoints 101, as well as one or more speakers or other audio output devices for audibly projecting audio information received from the remote endpoints 101.

In some embodiments, participant information for participants in the videoconference may be displayed to other participants, e.g., to enable the various participants to know who the other participants are. For example, if a participant A at a remote endpoint A is displayed on a display screen at a local endpoint B, the name or other information for the participant A may also be displayed on the display screen at the local endpoint B.

Figure 3:
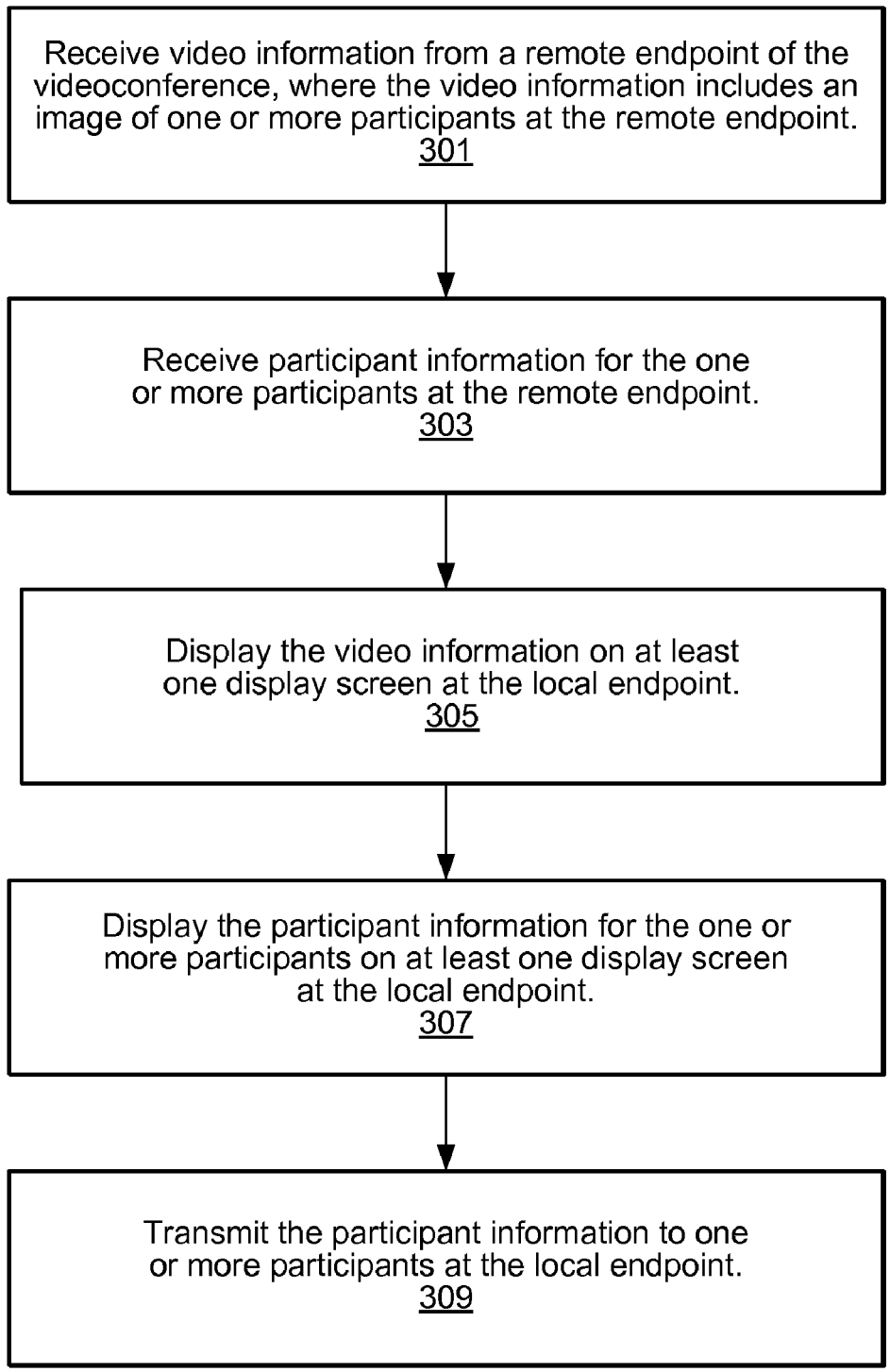
FIG. 3 is a flowchart diagram illustrating an embodiment of a method for displaying and/or sharing participant information for participants in a videoconference.

FIG. 3 is a flowchart diagram illustrating an embodiment of a method for displaying and/or sharing participant information for participants in a videoconference. The method of FIG. 3 may be implemented by a videoconferencing device 120 (referred to below as the local videoconferencing device) at an endpoint 101 (referred to below as the "local endpoint") in the videoconference.

At 301 the local videoconferencing device 120 may receive video information from a remote endpoint of the videoconference, where the video information includes an image of one or more participants at the remote endpoint.

At 303, the local videoconferencing device 120 may receive participant information for the one or more participants at the remote endpoint. The participant information for each participant may include distinguishing information associated with the participant, such as a name of the participant, a phone number of the participant, an email address of the participant, a mailing address of the participant, a job title of the participant, an employer of the participant, etc.

Figure 5:
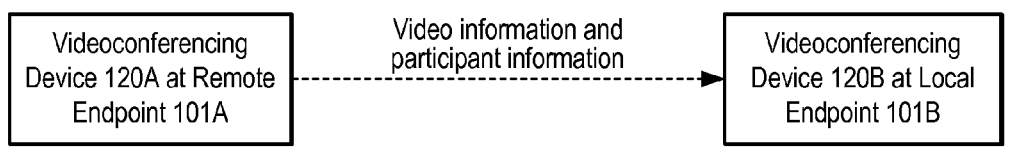
FIG. 5 illustrates an embodiment in which a videoconferencing device at a remote endpoint sends both video information and participant information to a videoconferencing device at a local endpoint.

At some embodiments, the local videoconferencing device 120 may receive the participant information from the remote endpoint of the videoconference. For example, as illustrated in FIG. 5, a videoconferencing device at the remote endpoint may send both the video information and the participant information to the local videoconferencing device 120. In some embodiments, the participant information may be represented by information separate from the video information. For example, the local videoconferencing device 120 and the remote videoconferencing device may communicate using a protocol in which the participant information is sent as a separate stream of information from the video information or is sent in a data object such that the participant information is distinguished from the video information. In some embodiments, the participant information may not be represented separately from the video information. For example, the remote videoconferencing device may create a composite image in which the video information includes the participant information, e.g., as text overlaid over the camera image.

Figure 6:
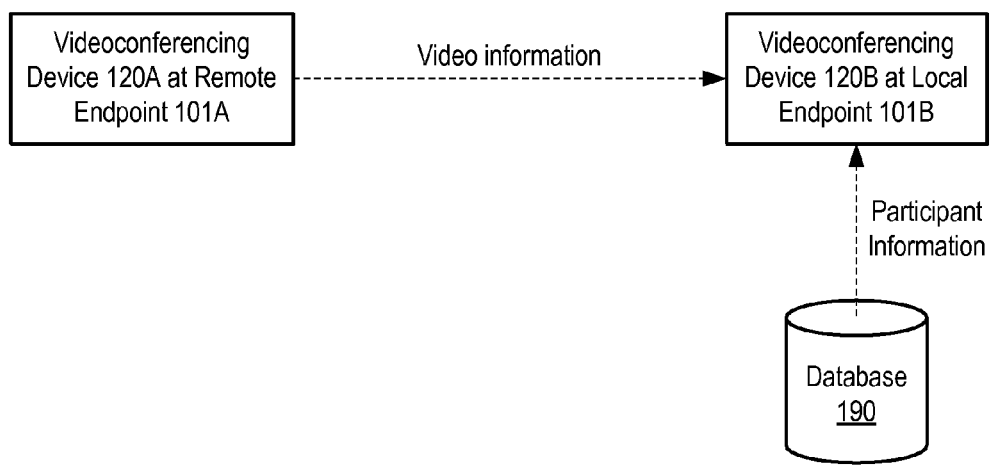
FIG. 6 illustrates an embodiment in which a local videoconferencing device at a local endpoint receives video information from a remote videoconferencing device at a remote endpoint and receives participant information from a database.

In some embodiments, the local videoconferencing device 120 may receive the participant information from a data source other than the remote endpoint of the videoconference. For example, in some embodiments, the local videoconferencing device 120 may communicate with a database at a location other than the remote endpoint to receive the participant information. For example, FIG. 6 illustrates an embodiment in which the local videoconferencing device 120 receives the video information from a remote videoconferencing device at the remote endpoint and receives the participant information from a database 190. The database 190 may be hosted by a computer server at a location other than the remote endpoint. Other locations are also contemplated.

At 305, the local videoconferencing device 120 may display the video information on at least one display screen at the local endpoint. Displaying the video information may include displaying the images of the one or more participants at the remote endpoint.

Figure 4:
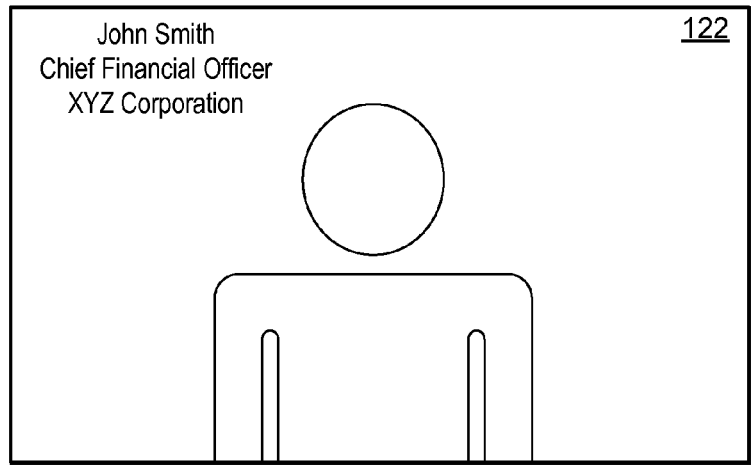
FIG. 4 illustrates an embodiment of a display in which an image of a participant is displayed together with participant information for the participant.

At 307, the participant data for the one or more participants may be displayed on at least one display screen at the local endpoint. In some embodiments, the display screen on which the participant information is displayed may be the same display screen as the display screen on which the video information is displayed. For example, FIG. 4 illustrates an embodiment in which an image of a participant at the remote endpoint is displayed on a display device 122 at the local endpoint. Participant information for the participant may be displayed together on the display device 122 substantially simultaneously with the image of the participant (e.g., the information may appear to be displayed at the same time as the image of the participant). In this embodiment the participant information includes a name of the participant (John Smith), a title of the participant (Chief Financial Officer), and a company with which the participant is associated (XYZ Corporation). In some embodiments, a participant (or other entity) may indicate the extent of the participant information to display. For example, a participant may specify that the extent of the participant information displayed should only include their first and last name. In some embodiments, the participant may include their job title in the extent of information that can be displayed. In some embodiments, the participant may specific that no information should be displayed for them. Other extents are also contemplated.

In some embodiments, multiple participants (or a single participant) of the remote endpoint may be displayed on a display device 122 at the local endpoint, and participant information for the participant(s) may be displayed together on the display device 122 simultaneously with the images of the participant(s). In some embodiments, the participant information for the participants may be displayed proximally to the respective images of the participants to which the participant information corresponds. Displaying the various portions of participant information proximally to the corresponding participants may visually associate the portions of participant information with the respective participants, thus enabling viewers at the local endpoint to ascertain which portions of participant information corresponds to which participants.

Figure 7:
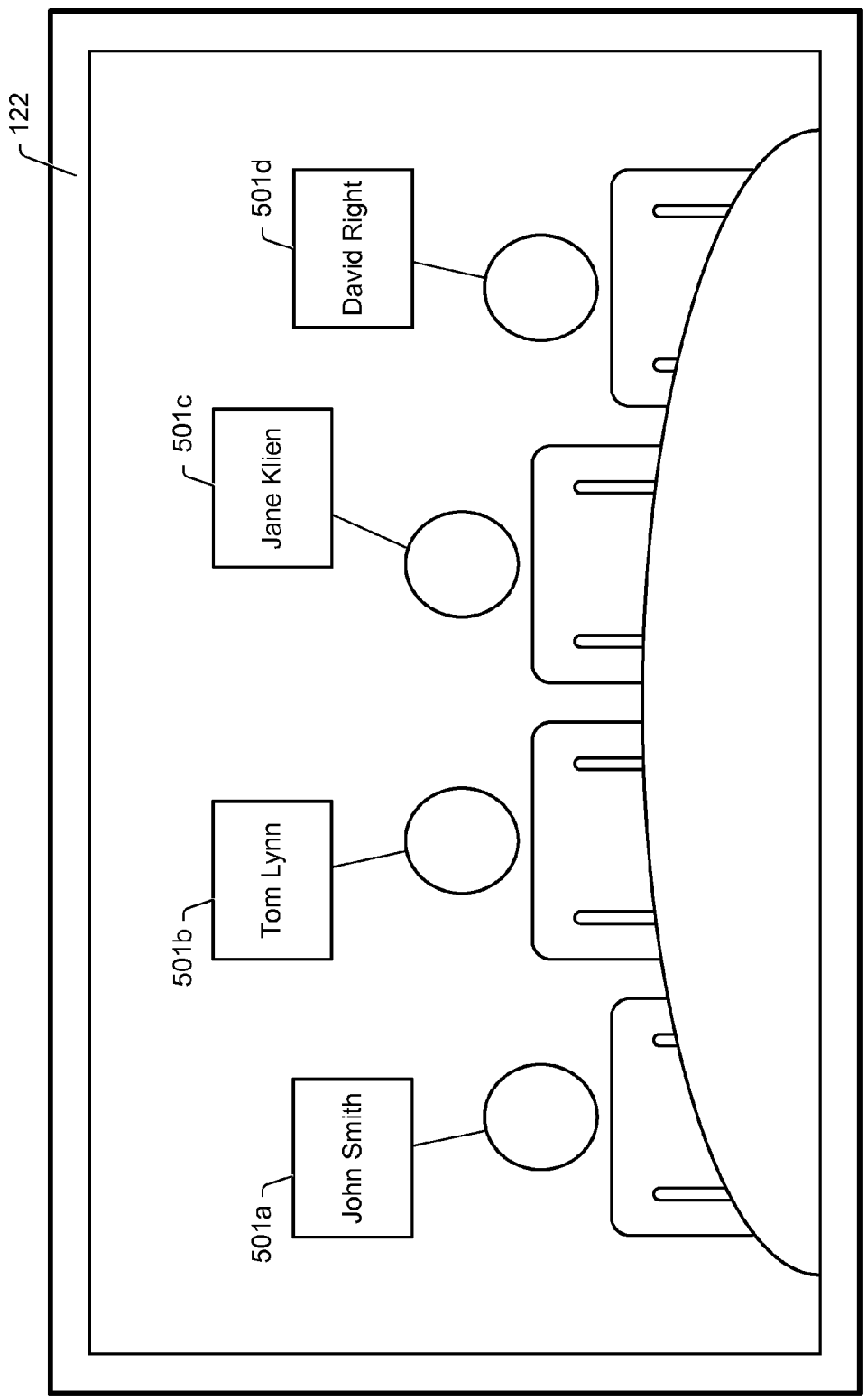
FIG. 7 illustrates an embodiment display in which a callout box is displayed proximally to each participant on a display screen, where each callout box displays a name of the respective participant.

In various embodiments, the different portions of participant information may be displayed in various ways such that the portions of participant information may be visually associated with their corresponding participants. For example, FIG. 7 illustrates an embodiment in which the local videoconferencing device 120 displays a callout box 501 proximally to each participant, where each callout box 501 displays a name of the respective participant. This may allow the viewers (participants) at the local endpoint to identify the remote participants by looking at the callout boxes 501 displayed proximally to the respective participants.

Figure 8:
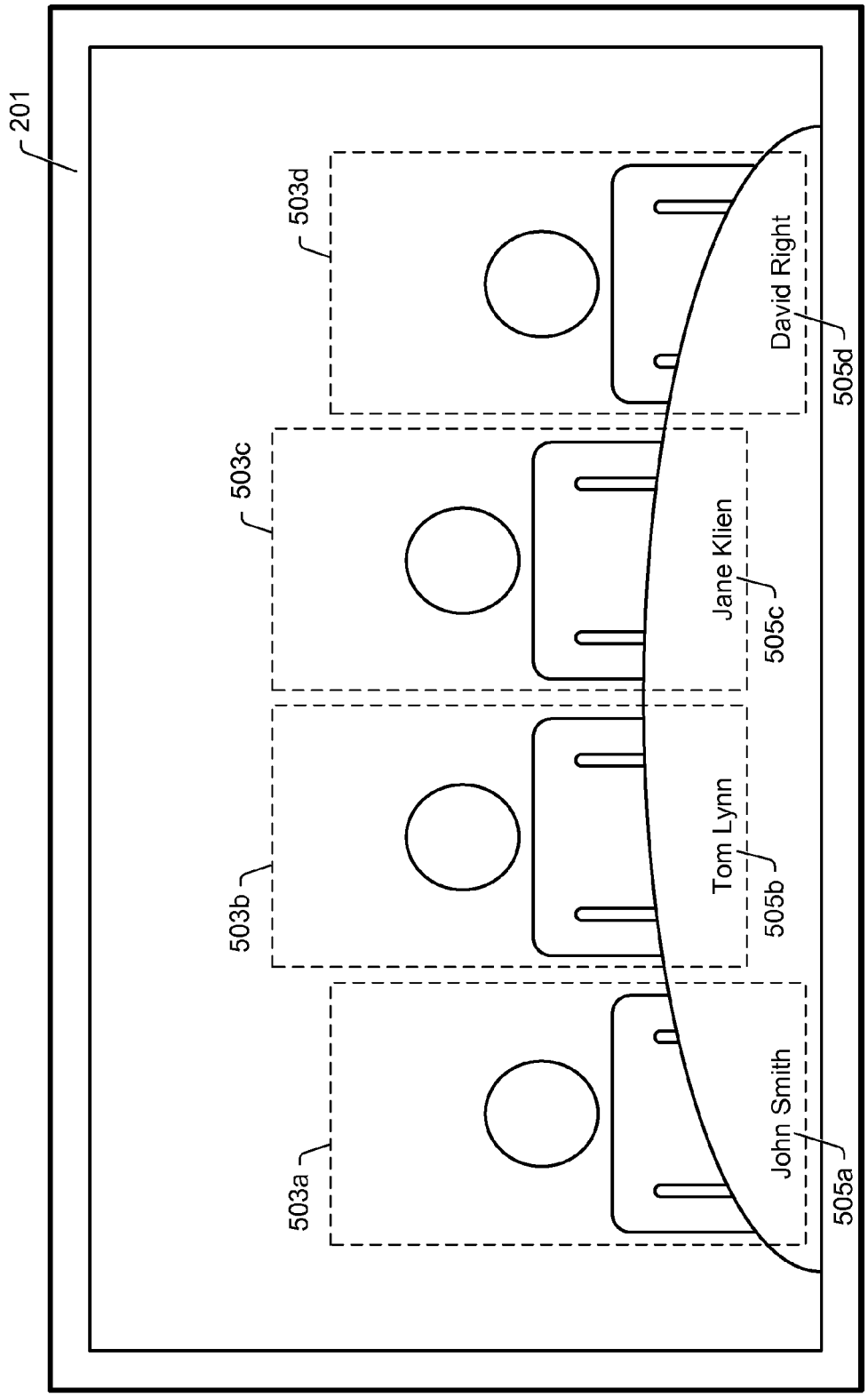
FIG. 8 illustrates an embodiment display in which multiple portions of participant information are displayed simultaneously with images of different participants.

FIG. 8 illustrates an embodiment in which multiple portions of participant information are displayed simultaneously with images of different participants. In this embodiment, the portions of participant information are visually associated with their corresponding participants by displaying a box 503 around each participant and displaying the name 505 of each participant within each respective box 503.

In some embodiments, multiple remote participants may be displayed simultaneously on the display device 122, but participant information may only be displayed for a subset of the participants shown on the display. For example, in some embodiments, the local videoconferencing device 120 may be operable to analyze the video information to determine which remote participant is currently speaking and may only display participant information for the current speaker. In some embodiments, one of the participants at the local endpoint may move a cursor around the display by operating a mouse or other input device. If the cursor hovers over an image of one of the remote participants, the local videoconferencing device 120 may display the participant information for that participant in response. Otherwise, in some embodiments, participant information may not be displayed for the participants.

In some embodiments, the participant information may be displayed on a different display screen than the display screen on which the video information is displayed. For example, in some embodiments, the local endpoint may include a main display screen and a supplemental display screen. The main display screen may display the video information received from the remote endpoint, and the participant information may be displayed on the supplemental display screen. In some embodiments, the local participants at the local endpoints may have a small personal display screen located at his seat, which he is able to control. For example, a local participant may operate an input device to provide user input to the local videoconferencing device 120 to request the local videoconferencing device 120 to display the participant information for a certain remote participant on his local display screen.

In some embodiments, in addition to or alternatively to displaying the participant information, the local videoconferencing device 120 may be operable to transmit the participant information for the remote participants to one or more of the local participants at the local endpoint. For example, the local videoconferencing device 120 may wirelessly transmit the participant information to a personal wireless device (e.g., a personal digital assistant (PDA), cell phone, laptop with a wireless link, etc.) of a local participant at the local endpoint. This may enable the personal wireless device of the local participant to automatically receive and store contact information or other participant information for the remote participants. In some embodiments, the local videoconferencing device 120 may send electronic correspondence (e.g., an email) including the participant information for the remote participants to an email address of the local participant.

Figure 9:
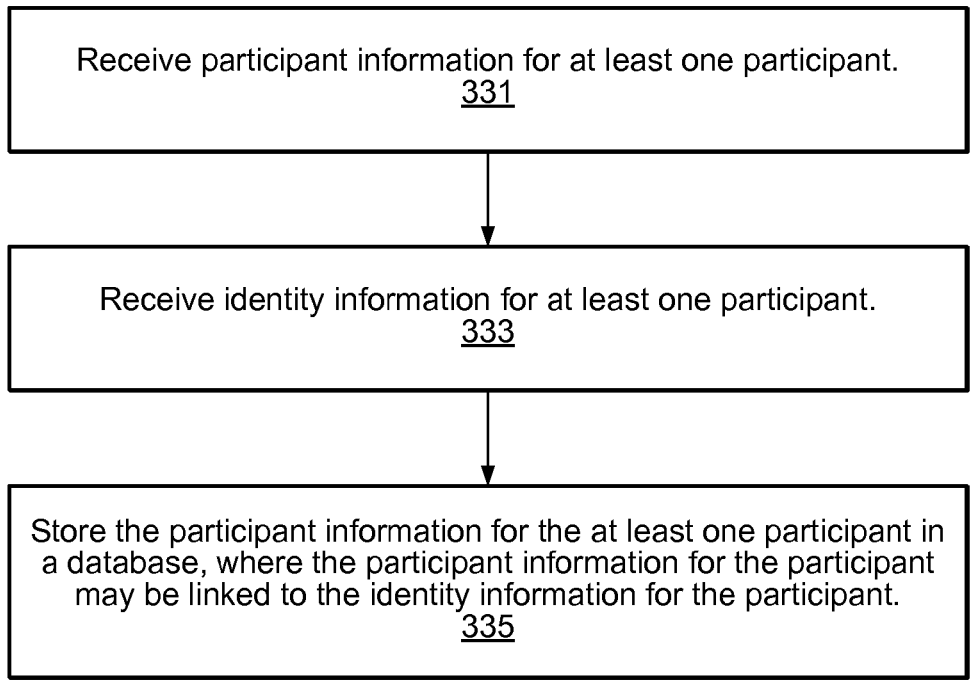
FIG. 9 is a flowchart diagram illustrating an embodiment of a method for pre-storing participant information in a database.

In some embodiments, the participant information received by the local videoconferencing device 120 in block 303 of FIG. 3 may be retrieved from a database in which the participant information was previously stored, e.g., stored prior to or during the videoconference. FIG. 9 is a flowchart diagram illustrating an embodiment of a method for pre-storing participant information in a database.

The method of FIG. 9 may be implemented by software executing on various kinds of systems. In some embodiments, the method may be implemented by software executing on a videoconferencing device 120. In some embodiments, the method may be implemented by software executing on a computer system other than a videoconferencing device 120.

At 331, participant information for at least one participant may be received. The participant information for the participant may include information such as the participant's name, telephone number, email address, job title, employer, etc. In some embodiments, the participant information for the participants may be received in response to user input manually specifying the participant information, e.g., via a keyboard or other input device. In some embodiments, the participant information for the participant may be received in other ways (e.g., from another program or database).

At 333, identity information for the at least one participant may be received. The identity information for the participant may include various kinds of information useable to identify the participant. In some embodiments, the identity information for the participant may include biometric information for the participant, such as fingerprint information, facial information, a voiceprint, a retinal scan, deoxyribonucleic acid (DNA) sample, etc. In some embodiments, the identity information for the participant may include an identification (ID) number or other information associated with the participant that identifies the participant. In some embodiments, the participant's name (which may be received as part of the participant information) may be used as the identity information.

The identity information for the participant may be received in various ways. For example, where the identity information includes biometric information, the biometric information may be received from a biometric device, such as a fingerprint scanner, camera, voice recorder, retinal scanner, etc. In some embodiments, where the identity information for each participant includes an ID number, the ID number may be received in response to user input manually specifying the ID number, e.g., via a keyboard or other input device.

At 335, the participant information for the participant may be stored in a database. The identity information for the participant may also be stored in the database. The participant information for the participant may be linked to the identity information for the participant in such a way that the identity information for the participant can later be used as a key to look up the participant's participant information in the database. For example, for a participant, a record in the database may be created, where the record includes both the participant's identity information and the participant's participant information. The identity information may later be used as a key to look up the records for participants in a videoconference to retrieve their participant information.

The method of FIG. 9 may be used to pre-store participant information for at least one person who may later participate in a videoconference. For example, the method may be used to pre-store participant information for each person who works for an organization and may participate in videoconferences conducted by that organization. When one or more of the people later participate in a videoconference, their previously stored participant information may be looked up from the database, e.g., so that the participant information can be shared with participants at another endpoint in the videoconference (e.g., see FIG. 3).

Figure 10:
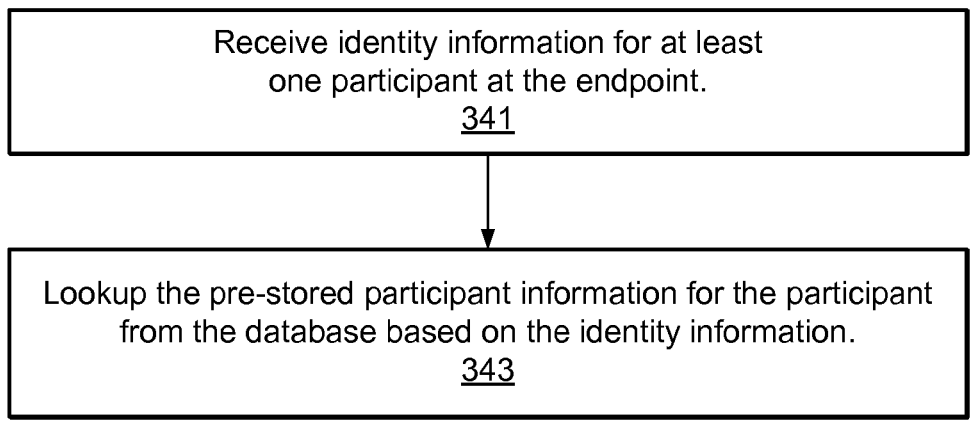
FIG. 10 is a flowchart diagram illustrating an embodiment of a method for looking up the previously stored participant information for participants in a videoconference.

FIG. 10 is a flowchart diagram illustrating an embodiment of a method for looking up the previously stored participant information for participants in a videoconference. For example, suppose that the videoconference includes an endpoint 101A and an endpoint 101B. Suppose also that participant information for participants at the endpoint 101A was previously stored in a database (e.g., see FIG. 9). For the purposes of this embodiment, the endpoint 101B is referred to as the local endpoint, and the endpoint 101A is referred to as the remote endpoint. In some embodiments, it may be desirable to display the participant information for the remote participants (the participants at endpoint 101A) on a display screen at the local endpoint (endpoint 101B). Thus, the participant information for the remote participants may be retrieved from the database, as shown by the method of FIG. 10.

At 341, identity information for at least one participant at the remote endpoint 101A may be received. The identity information for the participant may include the identity information that was previously received in block 333 of FIG. 9 and stored in the database in association with the participant information for the participant.

At 343, the participant information for the participant that was previously stored in the database may be looked up from the database based on the identity information. For example, for a participant, the participant information for the participant may be looked up by communicating with the database to perform a search or query to determine a matching record in the database, e.g., a record whose identity information matches the identity information received from the participant in 341. The participant information may then be extracted from the matching record.

In some embodiments, the participant information for a participant may be looked up from the database at the time of the videoconference, e.g., at or just prior to the beginning of the videoconference, when the participants are gathered together in a videoconference room. In some embodiments, the participant information for each participant may be looked up from the database in advance, e.g., before the beginning of the videoconference. For example, a list of the participants and/or other identity information for the participants may be provided to a software application that operates to communicate with the database to retrieve the participant information in advance of the videoconference. In some embodiments, the software application may be operable to notify a human if participant information is not available for one or more of the people who will participate in the videoconference. For example, if the list contains a name of a participant who does not have a record in the database then the software may send an email or otherwise notify an administrator that participant information for that participant needs to be entered into the database.

In some embodiments, the identity information received in 341 for a given participant may need to exactly match the participant's identity information that is stored in the record to consider the record a match. For example, where the identity information includes information such as an ID number, name, or password, the identity information received in 341 and the identity information stored in the record may need to exactly match. In some embodiments, where the identity information includes biometric information, various kinds of algorithms, heuristics, or matching criteria may be used to determine whether the identity information received in 341 matches the participant's identity information stored in the database record closely enough to consider the record a match.

In some embodiments, the method of FIG. 10 may be performed by the remote videoconferencing device at the remote endpoint 101A. For example, the identity information for each participant at the remote endpoint 101A may be received by the remote videoconferencing device at the remote endpoint 101A, and the remote videoconferencing device may communicate with the database to look up the participant information for each participant based on the identity information.

In some embodiments, the identity information for each participant may be received by the videoconferencing device at the remote endpoint automatically, e.g., without the participants at the remote endpoint actively or manually providing their identity information to the videoconferencing device. For example, in some embodiments, the identity information for each participant may include facial information, such as an image of the participant's face or information characterizing facial features of the participant's face. The videoconferencing device may receive video information from a camera at the remote endpoint, where the video information includes an image of each participant's face. For example, the participants may simply sit at a conference table facing toward the camera such that the camera captures a scene including each participant's face. The videoconferencing device may analyze the video information to automatically determine where the participants' faces are within the video information and may use the facial information to look up the participant information for each of the participants in the database.

Figure 11:
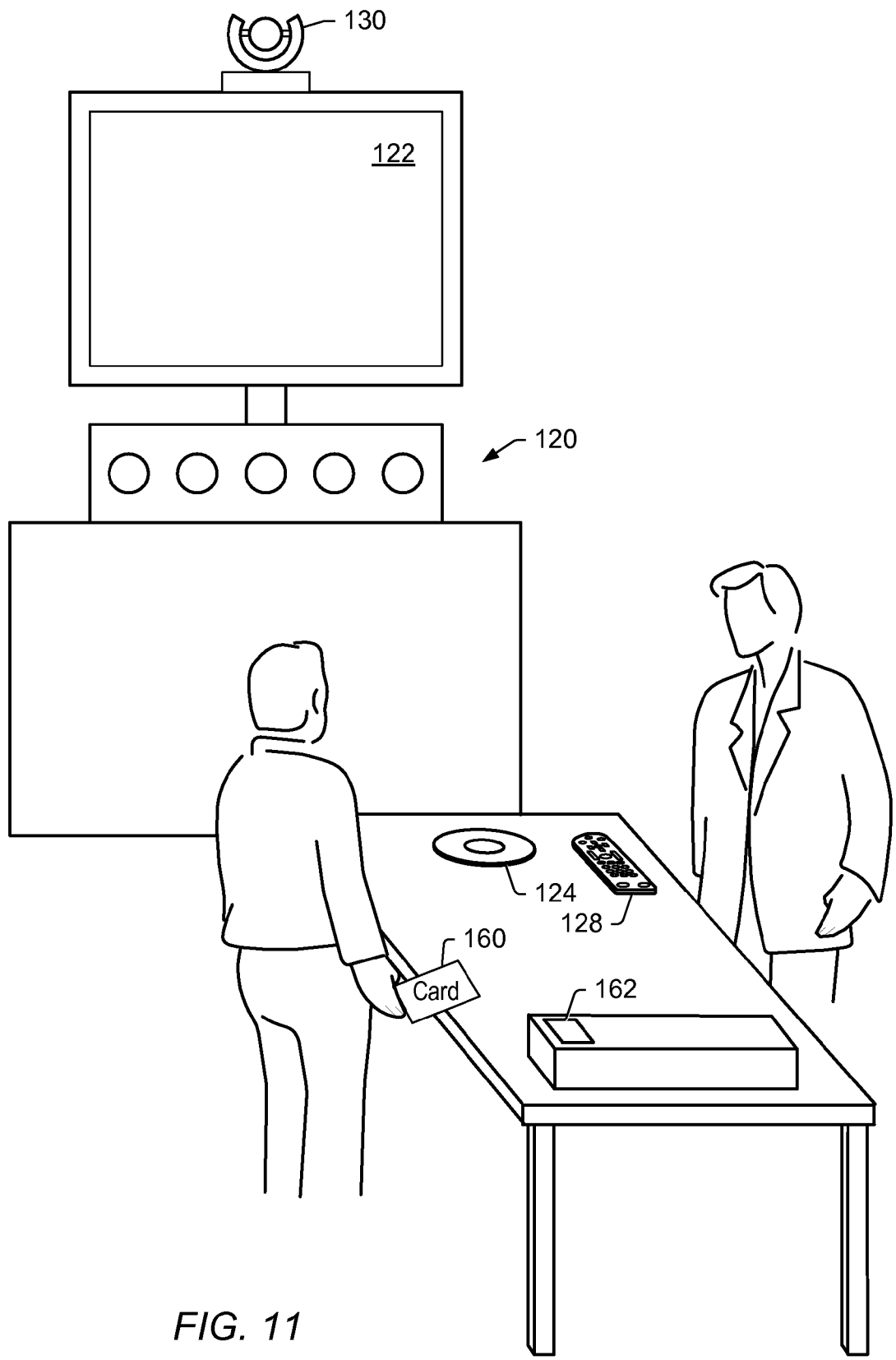
FIG. 11 illustrates an embodiment in which a videoconference participant carries a badge or card that stores the participant's identity information.

In some embodiments, the videoconferencing device at the remote endpoint 101A may automatically receive the identity information for each participant from a physical medium in the participant's possession. For example, each participant may carry a badge or card 160, as shown in FIG. 11. The badge or card 160 may store or encode the participant's identity information. When the participant enters the videoconference room and comes in close proximity to the videoconferencing device 120 at the remote endpoint, the videoconferencing device 120 may establish wireless communication with the participant's badge or card 160 to automatically receive the participant's identity information. The videoconferencing device 120 may then use the identity information received from the respective participants' badges or cards 160 to look up the participant information for each of the participants in the database. In some embodiments, various other kinds of personal devices operable to perform wireless communication may automatically provide the participants' identity information to the videoconferencing device, such as personal digital assistants (PDAs), cell phones, or other personal mobile devices.

In some embodiments, each participant at the remote endpoint 101A may actively or manually provide his identity information to the remote videoconferencing device at the remote endpoint 101A. For example, in some embodiments, each participant may carry a badge or card 160 that stores or encodes the participant's identity information. Instead of the badge or card 160 wirelessly transmitting the identity information to the videoconferencing device, in some embodiments, each participant may actively swipe his badge or card 160 through or place it on a reader device 162. The reader device 162 may be coupled to the videoconferencing device 120 via either a wired or wireless connection, and the videoconferencing device 120 may receive the identity information for the participants from the reader device 162.

In some embodiments, each participant (or another person on each participant's behalf) may provide user input via a keyboard or other input device coupled to the videoconferencing device to manually enter his identity information.

In some embodiments, participants at the remote endpoint 101A may also actively or manually provide identity information to the videoconferencing device at the remote endpoint 101A where the identity information includes biometric information. For example, if the identity information includes fingerprint information, then each participant may place a finger on a fingerprint scanner device. The fingerprint scanner device may scan the participant's fingerprint and send an image of the fingerprint or data characterizing the fingerprint to the videoconferencing device (which may use the fingerprint data to look up the participant information for the participant). In some embodiments, if the identity information includes voice information then each participant may speak into a microphone to provide a voice sample that can be used to look up his participant information. In some embodiments, identity information for the participants may include facial information and each participant may stand near the camera and look directly into the camera to enable the camera to obtain an accurate and detailed facial image of the participant that can be used to look up his participant information.

In some embodiments, at least a portion of the method of FIG. 10 may be performed by the local videoconferencing device at the local endpoint 101B. For example, in some embodiments, the identity information for each participant may be received by the remote videoconferencing device at the remote endpoint 101A and may then be sent to the local videoconferencing device at the local endpoint 101B. The local videoconferencing device may then communicate with the database to look up the participant information for each participant based on the identity information.

Figure 12:
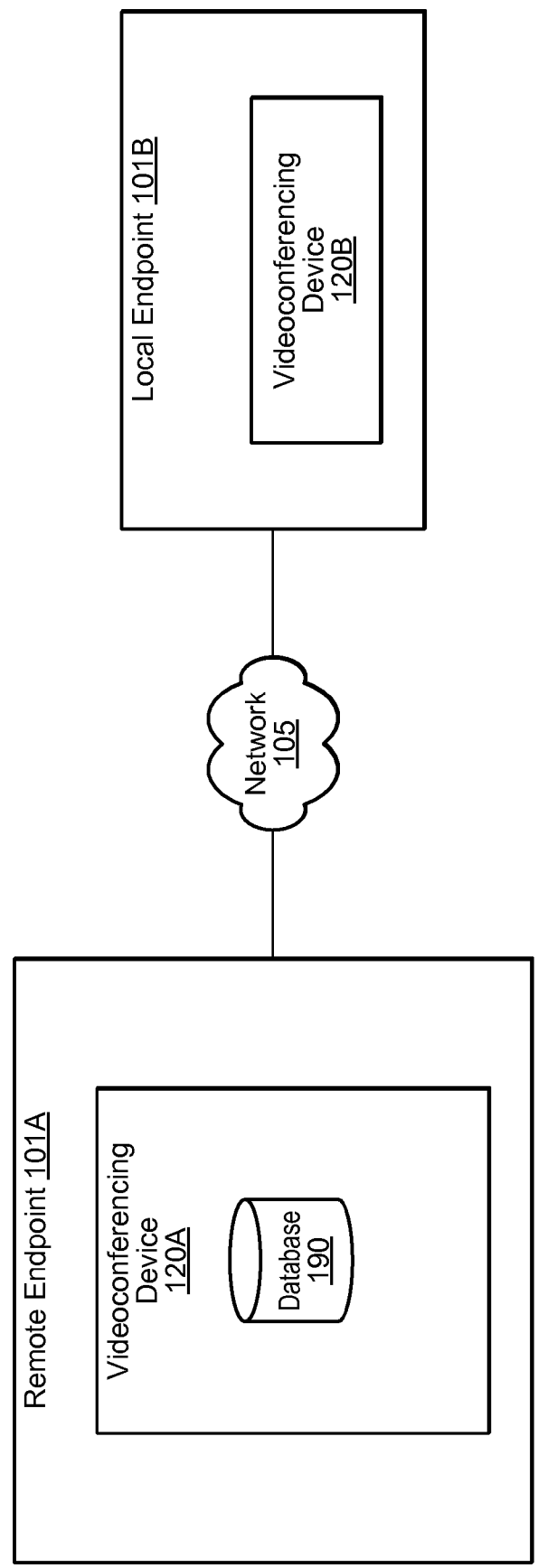
FIGS. 12-14 illustrate several exemplary implementations of a database in which participant information for participants may be stored.
Figure 13:
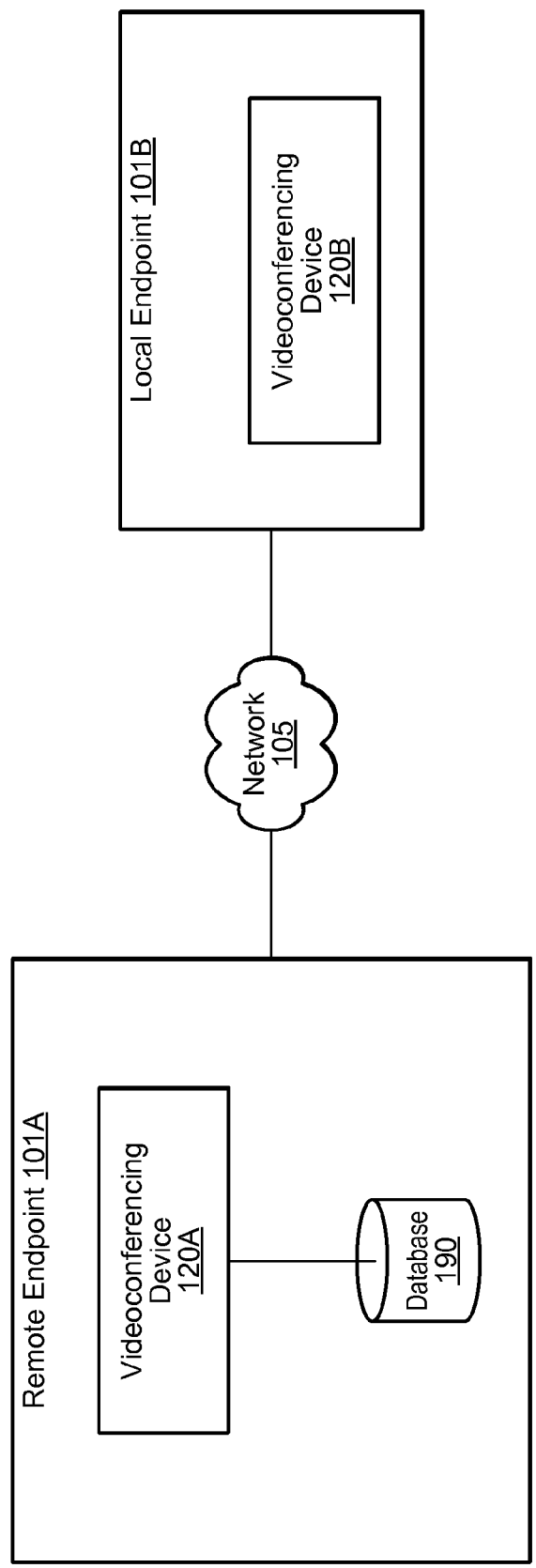
Figure 14:
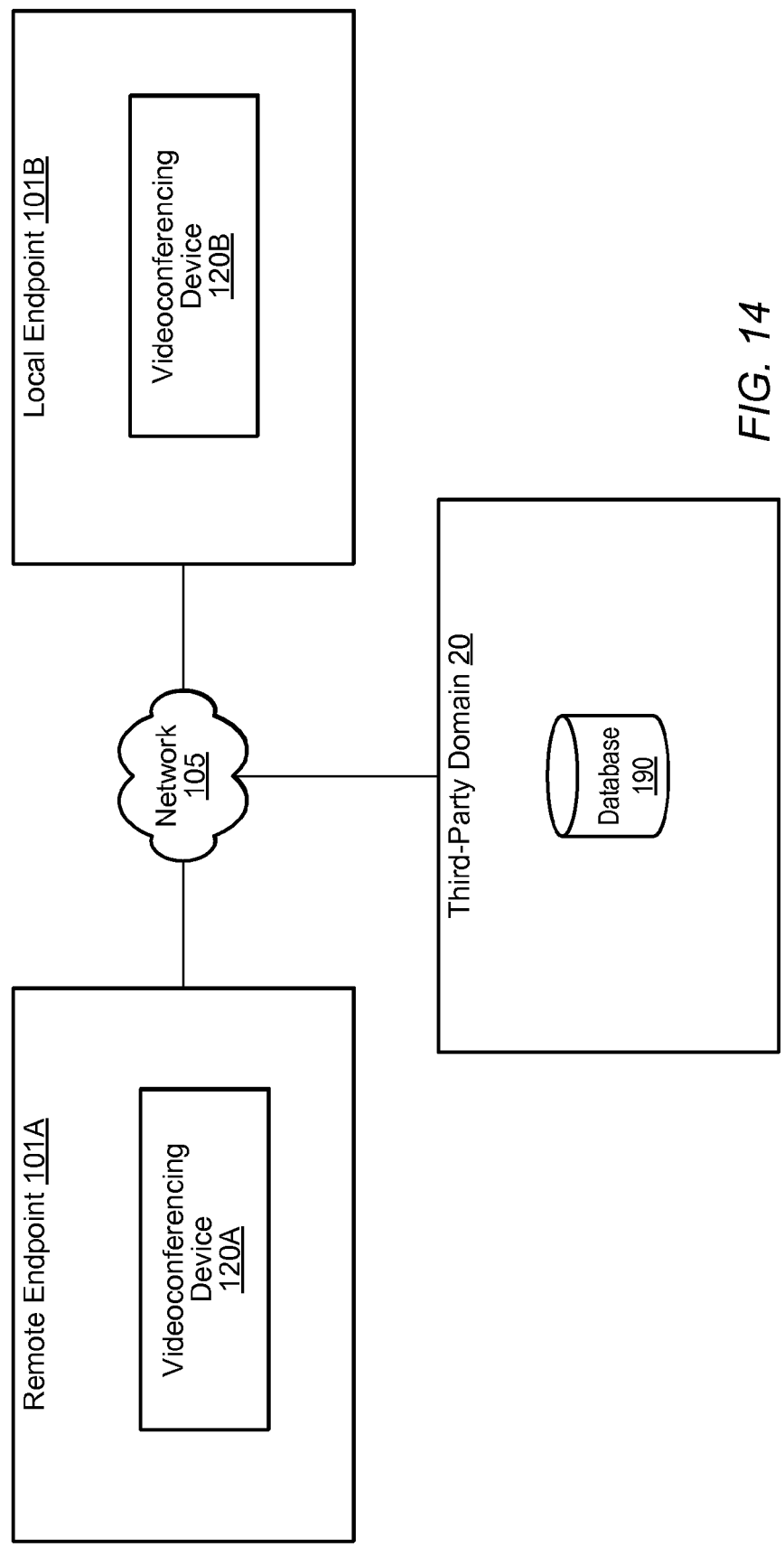

FIGS. 12-14 illustrate several exemplary implementations of a database 190 in which participant information for participants at the remote endpoint 101A may be stored (e.g., see FIG. 9). As seen in FIG. 12, the database 190 may be stored on or included in the videoconferencing device 120A at the remote endpoint 101A. For example, the database 190 may be stored on a hard disk or other memory medium of the videoconferencing device 120A. The videoconferencing device 120A may execute software operable to receive participant information and identity information for each of a plurality of people associated with the remote endpoint 101A. The videoconferencing device 120 may also store a respective record for each person in the database 190. The record for each person may link the person's identity information to his participant information.

At a later time, when a subset of the people for whom information is stored in the database 190 participate in a videoconference with the local endpoint 101B, the videoconferencing device 120A at the remote endpoint 101A may receive identity information for each of the persons participating in the videoconference at the remote endpoint 101A and retrieve their participant information from the database 190. The videoconferencing device 120A at the remote endpoint 101A may send the participant information for each of the participants at the remote endpoint 101A to the videoconferencing device 120B at the local endpoint 101B. The videoconferencing device 120B may display the participant information for the remote participants at the remote endpoint 101A on a display screen at the local endpoint 101B or share the participant information with the local participants at the local endpoint 101B in various other ways.

FIG. 13 illustrates an embodiment of the database 190 that is associated with the remote endpoint 101A, but is not stored on or included in the videoconferencing device 120A itself. For example, the database 190 may be stored on a computer system coupled to a local area network (LAN) at the remote endpoint 101A, where the videoconferencing device 120A is also coupled to the LAN. In some embodiments, the computer system may execute software operable to receive participant information and identity information and store the participant information for each person in the database 190 in association with the person's identity information. When a videoconference is held at a subsequent time, the videoconferencing device 120A may communicate with the computer system to retrieve participant information for videoconference participants from the database 190.

FIG. 14 illustrates an embodiment of the database 190 stored on a computer system or in a domain not associated with the remote endpoint 101A. The database 190 may instead be hosted by a server computer associated with, for example, a trusted third-party domain 20. For example, in some embodiments, the database 190 may be hosted by a vendor of the videoconferencing devices 120A and 120B or may be hosted by a third-party service provider for the videoconferencing devices 120A and 120B. The videoconferencing device 120A or another computer system at the remote endpoint 101A may communicate with the server computer in the trusted third-party domain 20 to store participant information and associated identity information for various people (e.g., employees) associated with the remote endpoint 101A in the database 190.

In some embodiments, when a videoconference is held at a subsequent time, the remote videoconferencing device 120A may send identity information for participants at the remote endpoint 101A to the server computer in the third-party domain 20. The server computer may then retrieve the participant information from records in the database 190 that match the identity information and return the participant information to the remote videoconferencing device 120A. The remote videoconferencing device 120A may then send the participant information to the local videoconferencing device 120B at the local endpoint 101B.

In some embodiments, the remote videoconferencing device 120A may send the identity information for participants at the remote endpoint 101A to the local videoconferencing device 120B at the local endpoint 101B. The server computer may retrieve the participant information from records in the database 190 that match the identity information and return the participant information for the remote participants to the local videoconferencing device 120B. The local videoconferencing device 120B may display the participant information for the remote participants on a display screen at the local endpoint 101B or share the participant information with the local participants at the local endpoint 101B in various other ways.

In some embodiments, participant information may be pre-stored in a database and later retrieved from the database for use in a videoconference. In some embodiments, the participant information may not be pre-stored in a database. For example, the participant information may be provided by the participants or may be provided on the participants' behalf at the time of the videoconference, e.g., at or just prior to the beginning of the videoconference or during the videoconference. For example, in some embodiments, the videoconferencing device at the remote endpoint 101A (e.g., the endpoint at which the participants are located) may automatically receive the participant information for each participant from a device in the participant's possession. In some embodiments, each participant may carry a badge or card that stores or encodes the participant's participant information. When the participant enters the conference room and comes in close proximity to the videoconferencing device at the remote endpoint 101A, the videoconferencing device may establish wireless communication with the participant's badge or card to automatically receive the participant information. In some embodiments, various other kinds of personal devices operable to perform wireless communication may automatically provide the participant information to the videoconferencing device, such as personal digital assistants (PDAs), cell phones, or other personal mobile devices.

In some embodiments, each participant at the remote endpoint 101A may actively or manually provide his participant information to the remote videoconferencing device at the remote endpoint 101A. For example, in some embodiments, each participant may carry a badge or card that stores or encodes his participant information. Instead of the badge or card wirelessly transmitting the participant information to the videoconferencing device, in some embodiments, each participant may actively swipe his badge or card through or place it on a reader device that is coupled to the videoconferencing device. Thus, the videoconferencing device may receive the participant information for the participants from the reader device.

In some embodiments, each participant may have a business card that lists information such as his name, job title, telephone number, and other participant information. Each participant may place his business card on a device operable to scan or analyze the business card to determine the participant information. For example, the device may scan the business card into an image and perform optical character recognition (OCR) algorithms on the image to determine the information listed on the business card.

In some embodiments, each participant (or another person on each participant's behalf) may provide user input via a keyboard or other input device coupled to the videoconferencing device to manually enter his participant information. For example, the videoconferencing device may execute software operable to display a graphical user interface enabling the participant information to be entered.

In some embodiments, where the participant information is provided by the participants at the time of the videoconference, the participant information may then be saved in a database. The participant information may be retrieved from the database for use in future videoconferences. For example, the first time a participant participates in a videoconference, the participant may place his business card in a scanner device that reads his participant information. The participant may also provide identity information such as a password or biometric information, which is stored in the database in association with his participant information. When the participant participates in future videoconferences, the participant information may simply provide the password, biometric information, or other identity information to identify himself so that his participant information can be looked up from the database, thus avoiding the need to re-scan the participant's business card to obtain his participant information.

Figure 15:
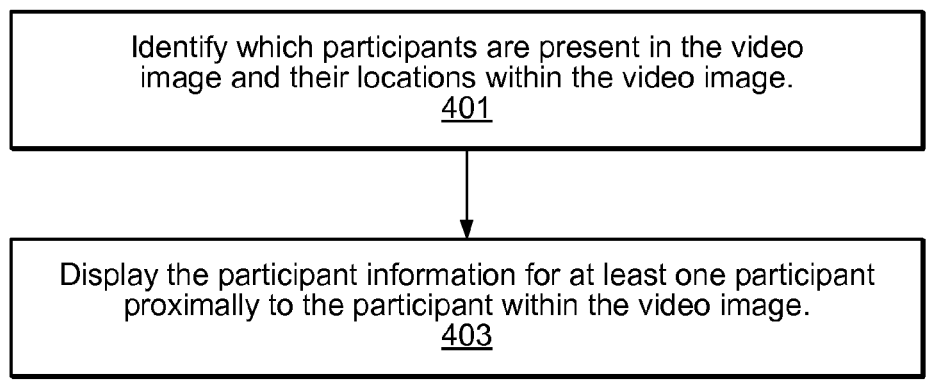
FIG. 15 is a flowchart diagram illustrating an embodiment of a method for correlating the participant information for various participants with the images of the participants displayed on the display screen.

In some embodiments (e.g., as illustrated in FIGS. 7 and 8), multiple participants at the remote endpoint may be displayed together on the display screen at the local endpoint, and participant information for each participant may be displayed on the display screen proximally to the respective participant. FIG. 15 is a flowchart diagram illustrating an embodiment of a method for correlating the participant information for various participants with the images of the participants displayed on the display screen.

As indicated in 401, the method may operate to identify which participants are present in the video image and their locations within the video image. In various embodiments, various kinds of techniques may be used to identify the participants and their locations within the video image.

As indicated in 403, the participant information for at least one participant may be displayed proximally to the participant within the video image.

In some embodiments, facial recognition techniques may be utilized to identify the participants and their locations within the video image. For example, in some embodiments, the local videoconferencing device at the local endpoint may receive the video image from the remote videoconferencing device. The local videoconferencing device may analyze the video image to determine one or more regions within the video image where a participant's face is located and may analyze each face to identify the participant. For example, a database may include records in which facial information (for example comprised in a data object with information (such as a comparative image) describing facial characteristics relevant to a particular participant) for each participant is linked to the participant's participant information. Thus, the local videoconferencing device may obtain the participant information for the participants whose faces appear within the video image by searching the database to find records whose facial information matches the faces in the video image. The local videoconferencing device may create a composite image by overlaying the participant information next to the respective faces in the video image.

Facial recognition may also be used to dynamically change or move the displayed participant information as the video image changes. For example, participants may walk or move across the video frame. The local videoconferencing device may operate to track the participants' faces as they move across the video frame and may update the display of the participant information accordingly. For example, if a participant moves from one side of the scene to the other then his participant information may be moved to maintain proximity with the participant. If a participant disappears out of the scene then his participant information may be removed from the display screen. If a new participant appears in the scene then participant information for the new participant may be displayed.

In some embodiments, the remote videoconferencing device at the remote endpoint may perform facial recognition techniques instead of the local videoconferencing device at the local endpoint. For example, the remote videoconferencing device may perform facial recognition techniques. Before sending the video image to the local videoconferencing device, the remote videoconferencing device may alter the video image so that participant information is displayed proximally to the participants.

In some embodiments, the identity of one or more participants in a videoconference may be verified, e.g., to ensure that the participants are really who they claim to be. For example, participants at one endpoint in the videoconference may need to ensure that a participant at another endpoint in the videoconference is really who he claims to be. Also, an organization may need to ensure that people who participate in videoconferences at the organization do not falsely represent their identity to remote participants, e.g., by falsely claiming to be executives or employees for the organization.

Figure 16:
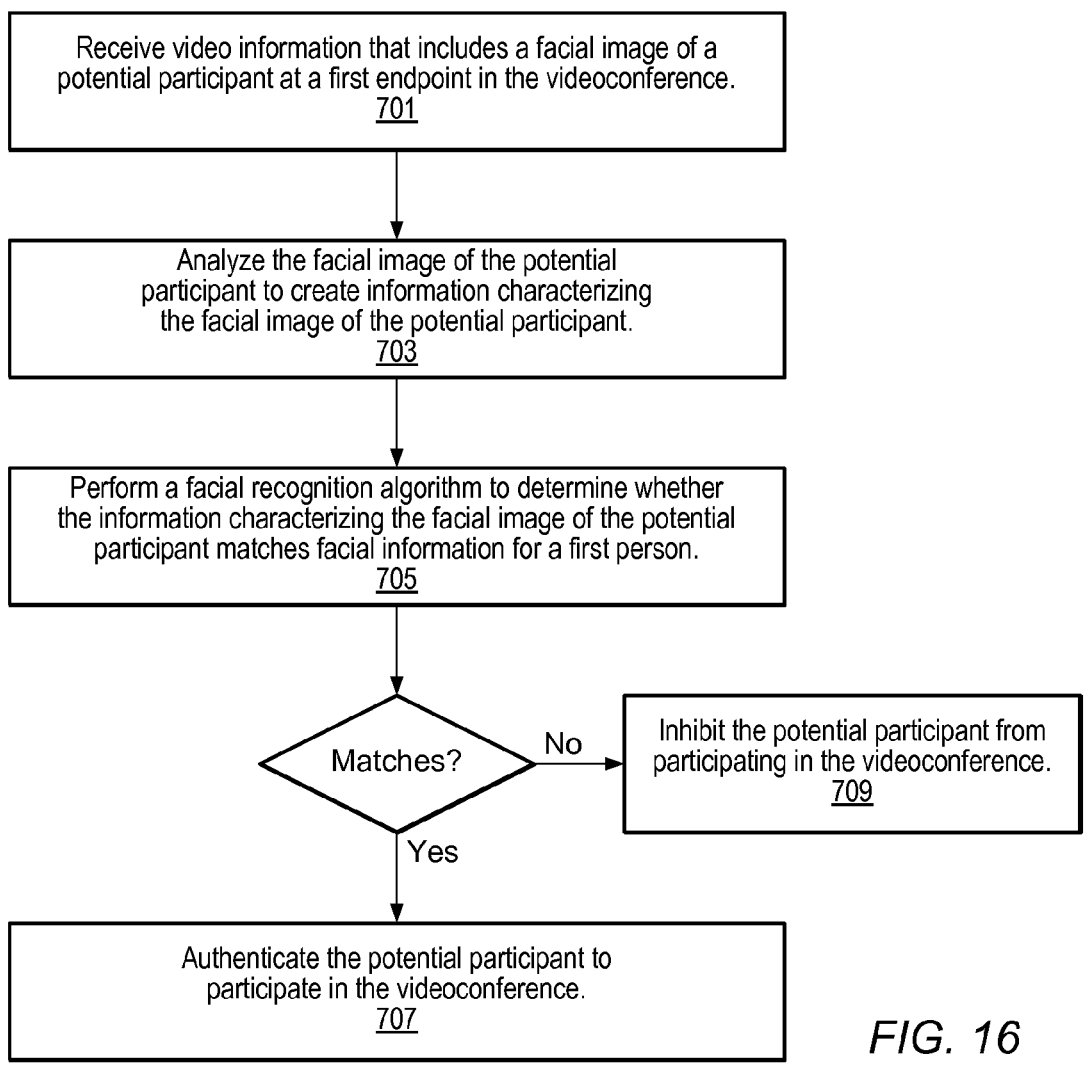
FIG. 16 is a flowchart diagram illustrating an embodiment of a method for verifying the identity of a potential participant in a videoconference using facial recognition.

In some embodiments, participant identity may be verified through facial recognition. For example, FIG. 16 is a flowchart diagram illustrating an embodiment of a method for verifying the identity of a potential participant in a videoconference (e.g., in which the potential participant claims to be a specific person). The potential participant may be located at a first endpoint in the videoconference. One or more participants who desire to videoconference with the specific person may be located at a second endpoint in the videoconference.

At 701, video information that includes a facial image of the potential participant may be received. In 703, the facial image of the potential participant may be analyzed to create information characterizing the facial image of the potential participant. In some embodiments, the video information may be analyzed to locate a region containing the facial image of the potential participant. In some embodiments, the facial image of the potential participant may occupy substantially all of the frame or may be located at a known position within the frame. Other locations and coverages for the facial image are also contemplated.

At 705, a facial recognition algorithm may be performed to determine whether the information characterizing the facial image of the potential participant matches facial information for the specific person. For example, an image of the face of the specific person may have been previously analyzed to create the facial information for the specific person, and the facial information for the specific person may have been stored, e.g., in a database. Thus, the method may include receiving the facial information for the specific person to compare it to the information characterizing the facial image of the potential participant.

In various embodiments, various techniques may be used to create the information characterizing the facial image, and various kinds of facial recognition algorithms may be performed to determine if there is a match. Exemplary facial recognition algorithms include Eigenface, Fisherface, the Hidden Markov model, Dynamic Link Matching, and three-dimensional face recognition.

If the facial recognition algorithm determines that there is a match then the potential participant may be authenticated to participate in the videoconference, as indicated in 707. Authenticating the potential participant to participate in the videoconference may include allowing the potential participant to participate in the videoconference in an open manner, e.g., since the facial recognition algorithm has determined that the potential participant is in fact the specific person. In some embodiments, the method may further include displaying information indicating that the potential participant has been authenticated to participate in the videoconference. For example, the information may be displayed on a display device at the first endpoint where the potential participant is located and/or on a display device at the second endpoint. The information may include various kinds of information to indicate that the potential participant was successfully authenticated, such as text information or a graphical icon.

If the facial recognition algorithm determines that the information characterizing the facial image of the potential participant does not match the facial information for the specific person then the potential participant may be inhibited from participating in the videoconference, as indicated in 709. In various embodiments, the potential participant may be inhibited from participating in the videoconference in various ways. For example, in some embodiments, information indicating that the facial image of the potential participant does not match the facial information for the specific person may be displayed, e.g., on a display device at the first endpoint and/or on a display device at the second endpoint. Displaying the information on the display device at the second endpoint may alert participants at the second endpoint that the potential participant may not be who he claims to be, i.e., may not be the specific person. In some embodiments, the method may include alerting the participants at the second endpoint in other ways, such as by causing an audio alert to be broadcast at the second endpoint.

In some embodiments, the functionality described above with reference to the method of FIG. 16 may be implemented by a videoconferencing device 120 at the first endpoint where the potential participant is located (or on another device). For example, the videoconferencing device 120 at the first endpoint may receive the video information including the facial image of the potential participant, e.g., from a camera at the first endpoint. The videoconferencing device 120 at the first endpoint may analyze the facial image of the potential participant to create the information characterizing the facial image of the potential participant.

The videoconferencing device 120 at the first endpoint may also receive the facial information for a specific person. For example, the facial information for the specific person may be retrieved from a database. In some embodiments, the database may be stored on a memory medium of the videoconferencing device 120. In some embodiments, the videoconferencing device 120 may communicate with another computer system on which the database is stored to receive the facial information for the specific person. In some embodiments, the database may be stored on a computer system that is external to the first endpoint. For example, the database may be hosted by a vendor of the videoconferencing device or by a third-party security organization.

The videoconferencing device 120 at the first endpoint may also perform the facial recognition algorithm to determine whether the information characterizing the facial image of the potential participant matches the facial information for the specific person, and may authenticate the potential participant to participate in the videoconference if there is a match.

The videoconferencing device 120 at the first endpoint may send audio and video information to a videoconferencing device 120 at the second endpoint as usual. In some embodiments, the videoconferencing device 120 at the first endpoint may also send information indicating whether the potential participant was successfully authenticated to another videoconferencing device 120 at the second endpoint. For example, the videoconferencing device 120 at the second endpoint may alert the participants at the second endpoint if the potential participant was not verified to be the specific person.

In some embodiments, the functionality described above with reference to the method of FIG. 16 may be implemented by a videoconferencing device at the second endpoint, i.e., an endpoint other than the first endpoint where the potential participant is located. For example, the videoconferencing device 120 at the second endpoint may receive the video information including the facial image of the potential participant from a videoconferencing device 120 at the first endpoint. The videoconferencing device 120 at the second endpoint may analyze the facial image of the potential participant to create the information characterizing the facial image of the potential participant and may perform a facial recognition algorithm to determine whether the information characterizing the facial image of the potential participant matches the facial information for the specific person. In some embodiments, the videoconferencing device 120 at the second endpoint may receive the facial information for the specific person from various sources, e.g., from a database stored on the videoconferencing device 120 at the second endpoint or from a database stored on another computer system.

Figure 17:
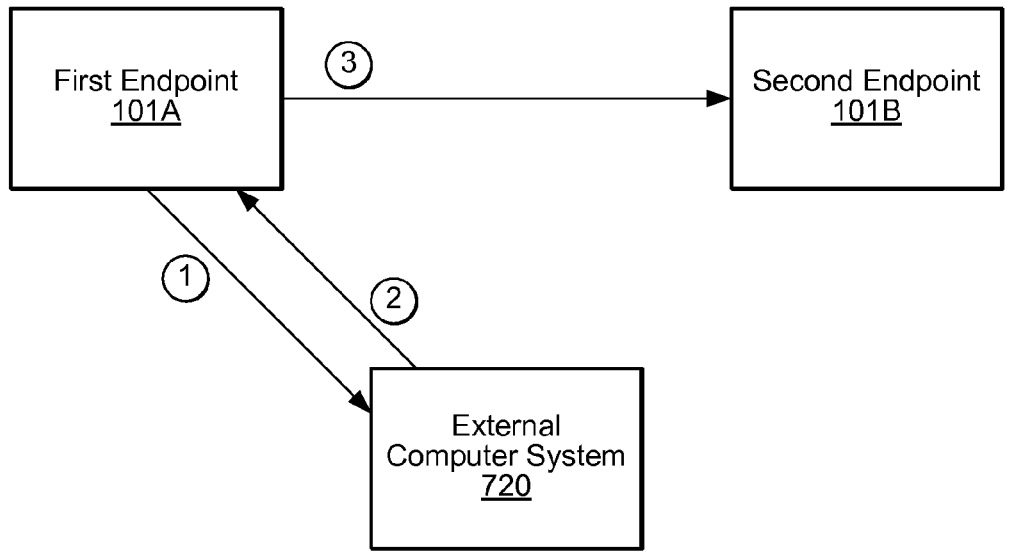
FIGS. 17 and 18 illustrate an embodiment of a computer system for performing a facial recognition algorithm.

In some embodiments, a computer system that is external to both the first endpoint and the second endpoint may perform the facial recognition algorithm. For example, FIG. 17 illustrates an embodiment in which the first endpoint sends the facial image of the potential participant or the video information including the facial image of the potential participant to an external computer system 720, as indicated by arrow 1. The external computer system 720 may store a database that includes facial information for various people, including the facial information for the specific person. For example, the external computer system 720 may be managed by a trusted third party, e.g., an organization different from the organizations with which the first and second endpoints are associated. The third party may provide security authentication services for videoconferences. The external computer system 720 may perform the facial recognition algorithm and report back to the videoconferencing device 120 at the first endpoint whether the information characterizing the facial image of the potential participant matched the facial information for the specific person, as indicated by arrow 2. As indicated by arrow 3, the videoconferencing device 120 at the first endpoint may send information to the videoconferencing device 120 at the second endpoint, such as the video information and possibly also an indication of whether the potential participant was successfully authenticated.

Figure 18:
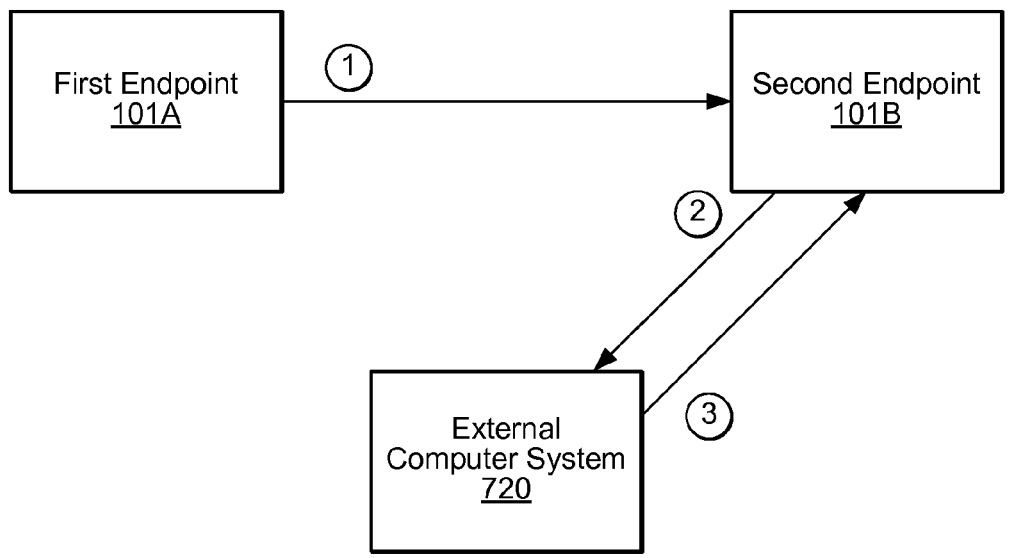

FIG. 18 illustrates an embodiment of the videoconferencing device 120 at the first endpoint sending the video information (including the facial image of the potential participant) to the videoconferencing device 120 at the second endpoint (e.g., see arrow 1). As indicated by arrows 2 and 3, the second endpoint may communicate with the external computer system 720 to verify the identity of the potential participant.

In some embodiments, participants in the videoconference may be authenticated using various other kinds of biometric information instead of or in addition to facial information. For example, the videoconferencing device 120 at the first endpoint may receive biometric information for a potential participant at the first endpoint, e.g., through a device operable to obtain the biometric information. Exemplary types of biometric information include voice information, fingerprint information, and retinal information. The videoconferencing device 120 may perform a biometric recognition algorithm to determine whether the biometric information for the potential participant matches previously stored biometric information for the specific person. The potential participant may be authenticated to participate in the videoconference if the biometric recognition algorithm determines that there is a match or the potential participant may be inhibited from participating otherwise.

Figure 19:
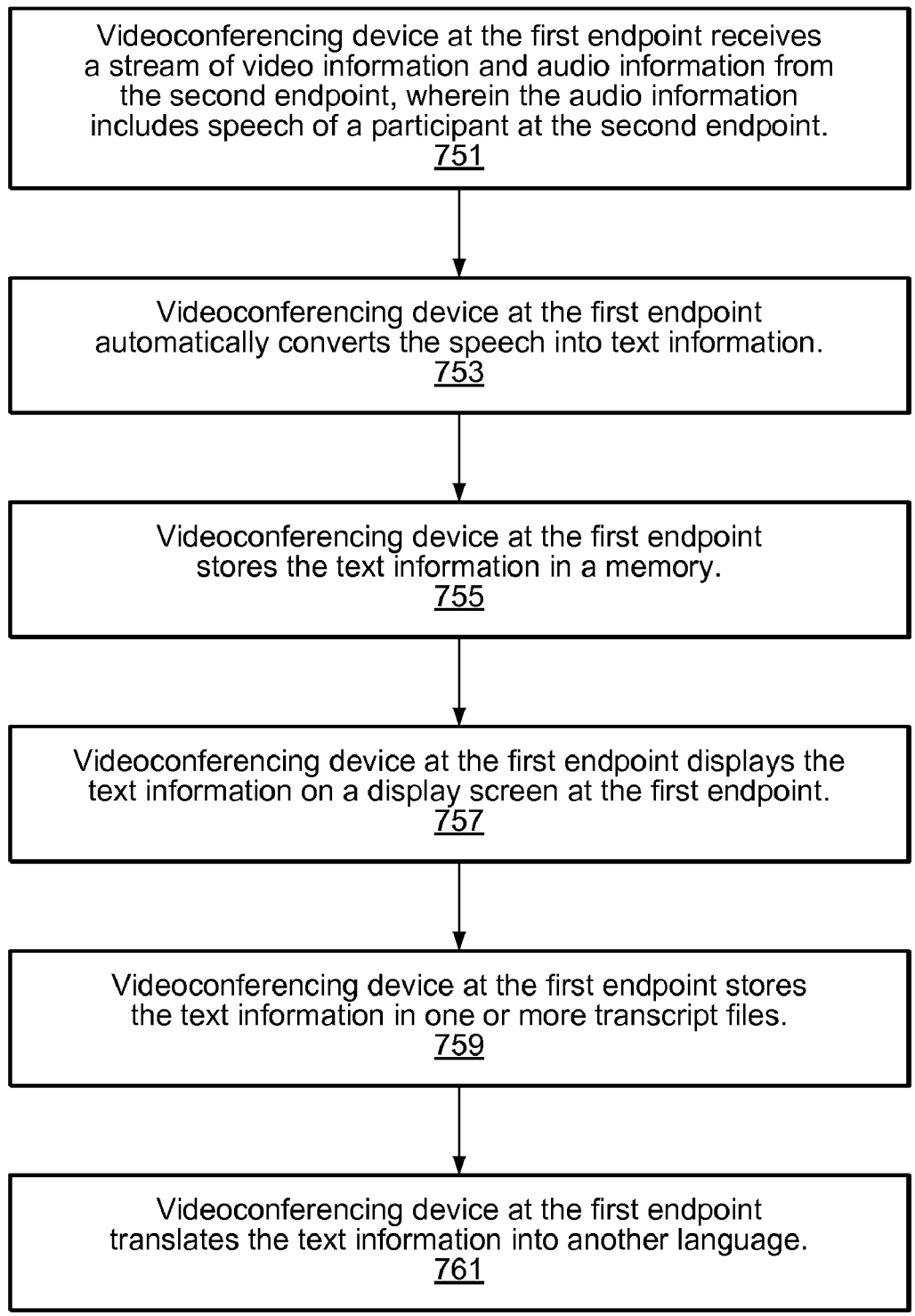
FIG. 19 is a flowchart diagram illustrating an embodiment of a method for automatically converting audio speech of a participant in a videoconference into text information.

In some embodiments, one or more of the videoconferencing devices 120 in the videoconference may be operable to automatically convert audio speech of participants in the videoconference into text information. The text information may be useful for various purposes. FIG. 19 is a flowchart diagram illustrating an embodiment of a method for automatically converting the audio speech into text information.

As indicated in 751, a videoconferencing device 120 at a first endpoint in the videoconference may receive a stream of video information and audio information from a second endpoint in the videoconference. For example, a videoconferencing device 120 at the second endpoint may send the video information and audio information to the videoconferencing device 120 at the first endpoint in a videoconference. The audio information may include audio speech of a participant at the second endpoint, e.g., where the participant is currently speaking.

At 753, the videoconferencing device 120 (e.g., at the first endpoint) may automatically convert the speech of the participant into text information. In other words, the participant's audio speech may be converted from a spoken language form into a textual, written language form. In some embodiments, one or more processors (or other computational elements on the videoconferencing device 120) at the first endpoint may dynamically perform speech-to-text conversion as the audio information is streamed to the first endpoint to convert the speech into text information in real time. For example, the words spoken by the participant at the second endpoint may be converted into text information substantially simultaneously as the participant speaks them. In some embodiments, there may be delays incurred when transmitting the audio information over the network from the second endpoint to the first endpoint. There may also be delays for the processing time associated with performing the speech-to-text conversion.

As indicated in 755, the videoconferencing device 120 at the first endpoint may store the text information in a memory of the videoconferencing device 120 at the first endpoint. Storing the text information in the memory may enable the text information to be used for various purposes.

For example, in some embodiments, the videoconferencing device 120 at the first endpoint may display the text information on a display screen at the first endpoint, as indicated in 757. For example, the videoconferencing device 120 may be operable to create a composite image in which the text information is overlaid on or displayed simultaneously with the video information, where the video information includes a live image of the participant at the second endpoint speaking. Thus, displaying the text information may enable participants at the first endpoint to see the text information representing the speech of the participant at the second endpoint while viewing the participant speak.

In some embodiments, the videoconferencing device 120 at the first endpoint may also, or may alternatively, store the text information in one or more transcript files, as indicated in 759. The videoconferencing device 120 may also convert speech of the local participants at the first endpoint into text information to have a complete transcript of the videoconference audio. The transcript may be useful for the videoconference participants to review what was said during the videoconference at a later time.

In some embodiments, the videoconferencing device 120 at the first endpoint may also, or may alternatively, translate the text information into another language, as indicated in 759. For example, one or more processors or other computational elements on the videoconferencing device 120 at the first endpoint may dynamically translate the text information from a first language into a second language. The videoconferencing device 120 may also display the translated text in the second language on the display screen at the first endpoint. This may enable participants at the first endpoint to see a translation of the speech of the participant at the second endpoint while simultaneously viewing the participant speak.

In some embodiments, the videoconferencing device 120 at the first endpoint may also be operable to perform voice recognition to identify the participant at the second endpoint based on the speech of the participant, e.g., to determine who is speaking. The text information may be associated with the participant in various ways, e.g., by including the participant's name in the text information. In some embodiments, the videoconferencing device 120 may also have knowledge of where the first participant is displayed in the video frame, e.g., based on facial recognition or other information. The text information representing the participant's speech may be displayed proximally to the participant within the video frame.

In some embodiments, the speech of the participant at the second endpoint may be converted into text by the videoconferencing device 120 at the second endpoint instead of by the videoconferencing device 120 at the first endpoint. For example, the videoconferencing device 120 at the second endpoint may convert the speech into text. In some embodiments, the videoconferencing device 120 at the second endpoint may create a composite image of the participants at the second endpoint with the text information overlaid and may send the composite image to the videoconferencing device 120 at the first endpoint. In some embodiments, the videoconferencing device 120 at the second endpoint may send the text information and the video information to the videoconferencing device 120 at the first endpoint using a protocol that distinguishes the text information from the video information. The videoconferencing device 120 at the first endpoint may then use the text information for various purposes.

In various embodiments, several embodiments may be implemented by various kinds of videoconferencing devices 120. FIG. 20 illustrates an exemplary videoconferencing device 120 according to an embodiment. It is noted that other embodiments of videoconferencing devices 120 may include various other kinds of components and may operate in various other ways to achieve the functionality described above, and that FIG. 20 represents an exemplary embodiment only.

The videoconferencing device 120 of FIG. 20 may include inputs 412 for receiving input streams from remote videoconferencing devices 120 at other endpoints in the videoconference. The input streams may include video information and audio information from the remote endpoints. The videoconferencing device 120 may also receive video and audio information from local video and audio devices via the inputs 412.

In the illustrated embodiment, the videoconferencing device 120 may also include field programmable gate array (FPGA) hardware 402, e.g., one or more FPGA chips. The FPGA hardware 402 may be operable to process the audio and video input information and produce audio and video output information to be sent to one or more display devices and one or more audio devices at the local endpoint via the outputs 414.

The videoconferencing device 120 may also include a processor 404 coupled to a memory 406. The memory 406 may be configured to store program instructions and/or data. In particular, the memory 406 may store operating system (OS) software 409, driver software 408, and application software 410. In some embodiments, the memory 406 may include one or more forms of random access memory (RAM) such as dynamic RAM (DRAM) or synchronous DRAM (SDRAM). However, in some embodiments, the memory 406 may include other types of memory instead or in addition.

It is noted that the processor 404 is representative of various types of processors. For example, in some embodiments, the processor 404 may be compatible with the x86 architecture, while in some embodiments, the processor 404 may be compatible with the SPARC™ family of processors. Also, in some embodiments, the videoconferencing device 120 may include multiple processors 404.

The processor 404 may be configured to execute the software and to operate on data stored within the memory 406. The application software 410 may interface with the driver software 408 to communicate with or control the FPGA hardware 402 in various ways. For example, the application software 410 may communicate with the FPGA hardware 402 via the driver software 408 to control the FPGA hardware 402 to create a composite image including the video information from multiple video sources, e.g., to display multiple participants in the videoconference in a continuous presence display.

The application software 410 may also cause the display of a graphical user interface (GUI), e.g., in response to a user operating a remote control device to provide input to the videoconferencing device 120. For example, various GUI elements may be superimposed over the displayed video signals in the composite image, such as GUI elements for receiving user input and/or GUI elements for displaying information to the user.

The FPGA hardware 402 and/or the processor 404 may be operable to perform the various methods, such as displaying participant information, performing facial recognition, performing voice recognition, and performing speech-to-text conversion.

Figure 21A:
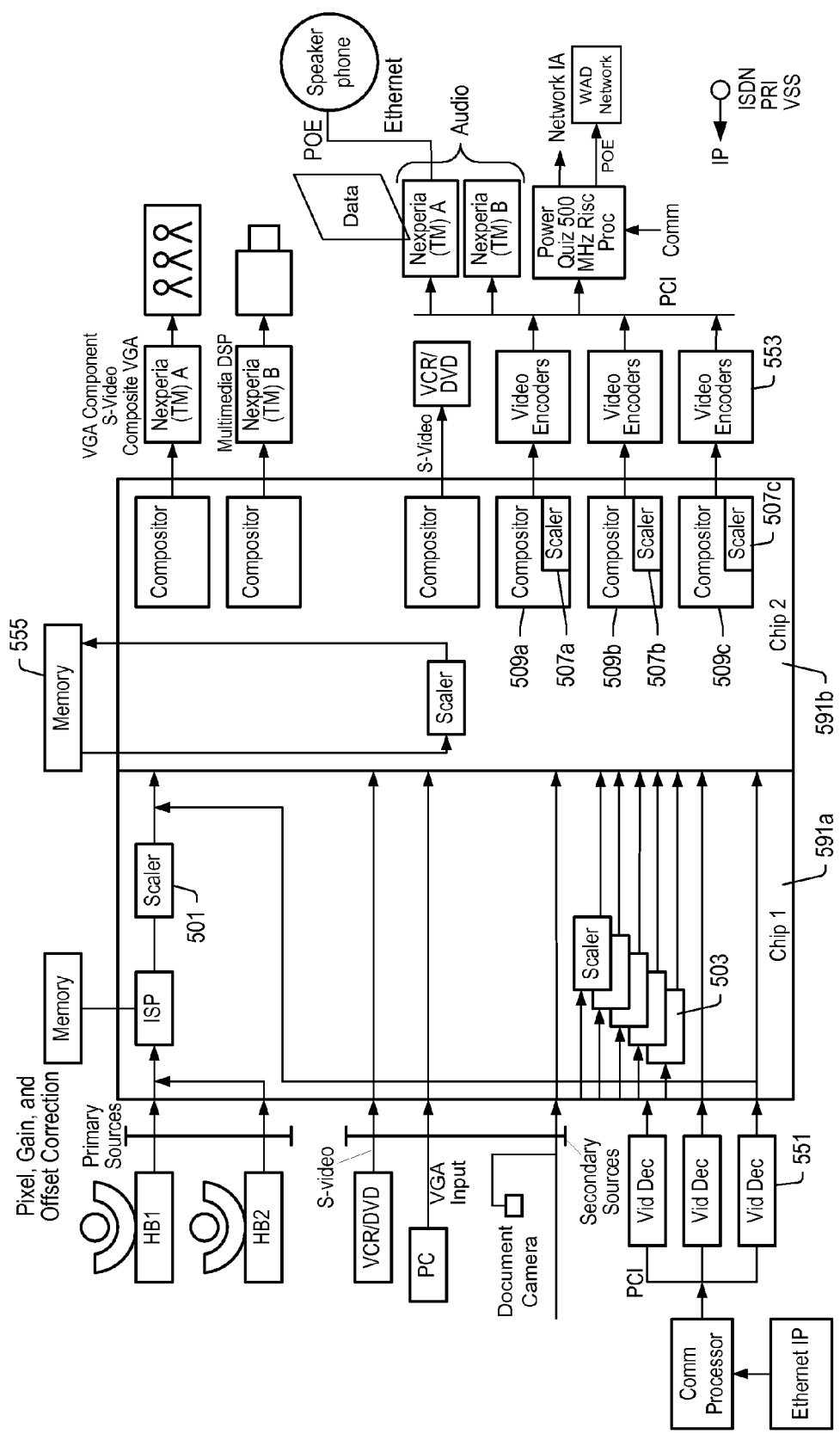
FIGS. 21A-21D illustrate exemplary hardware components for a videoconferencing device, according to an embodiment.
Figure 21B:
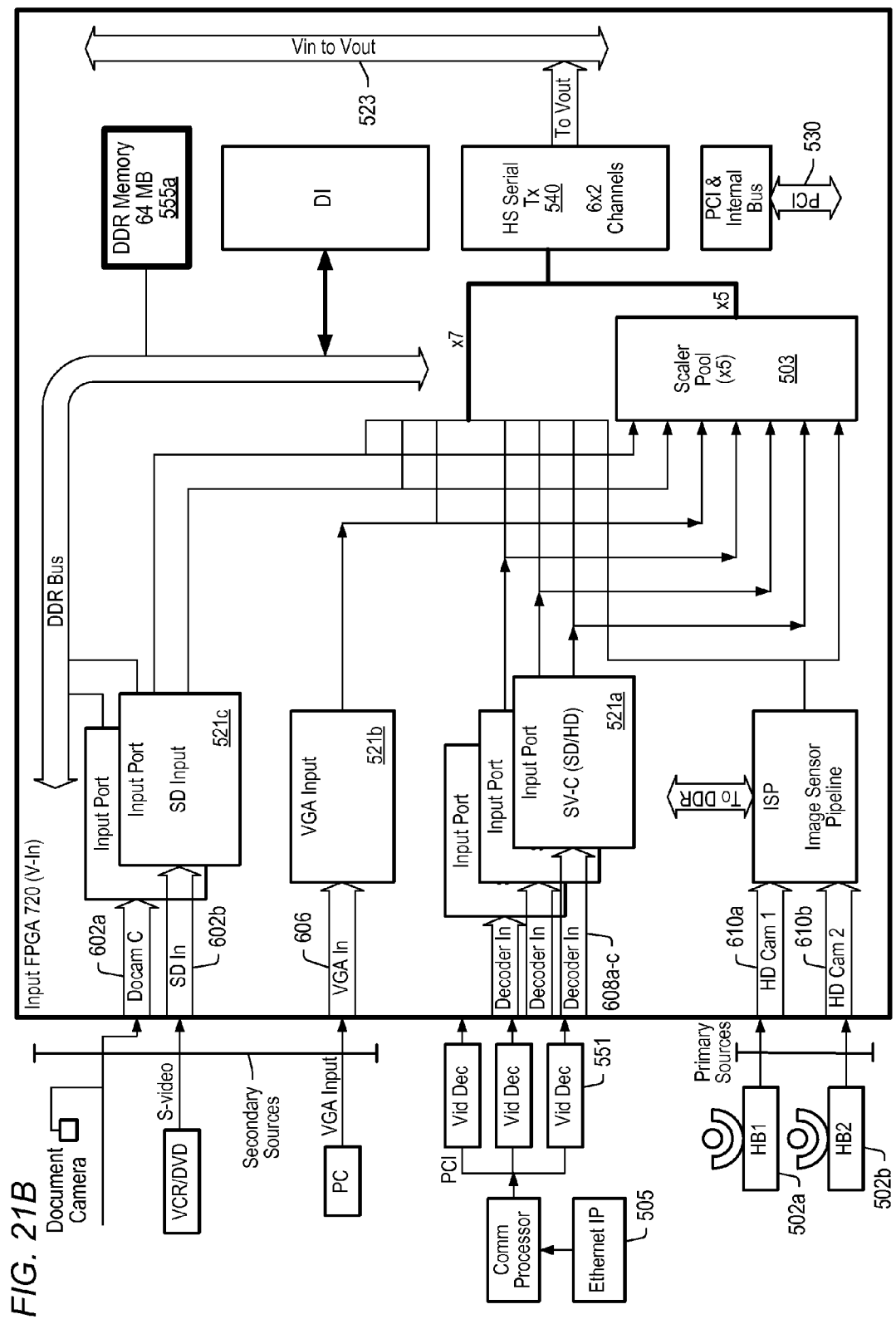
Figure 21C:
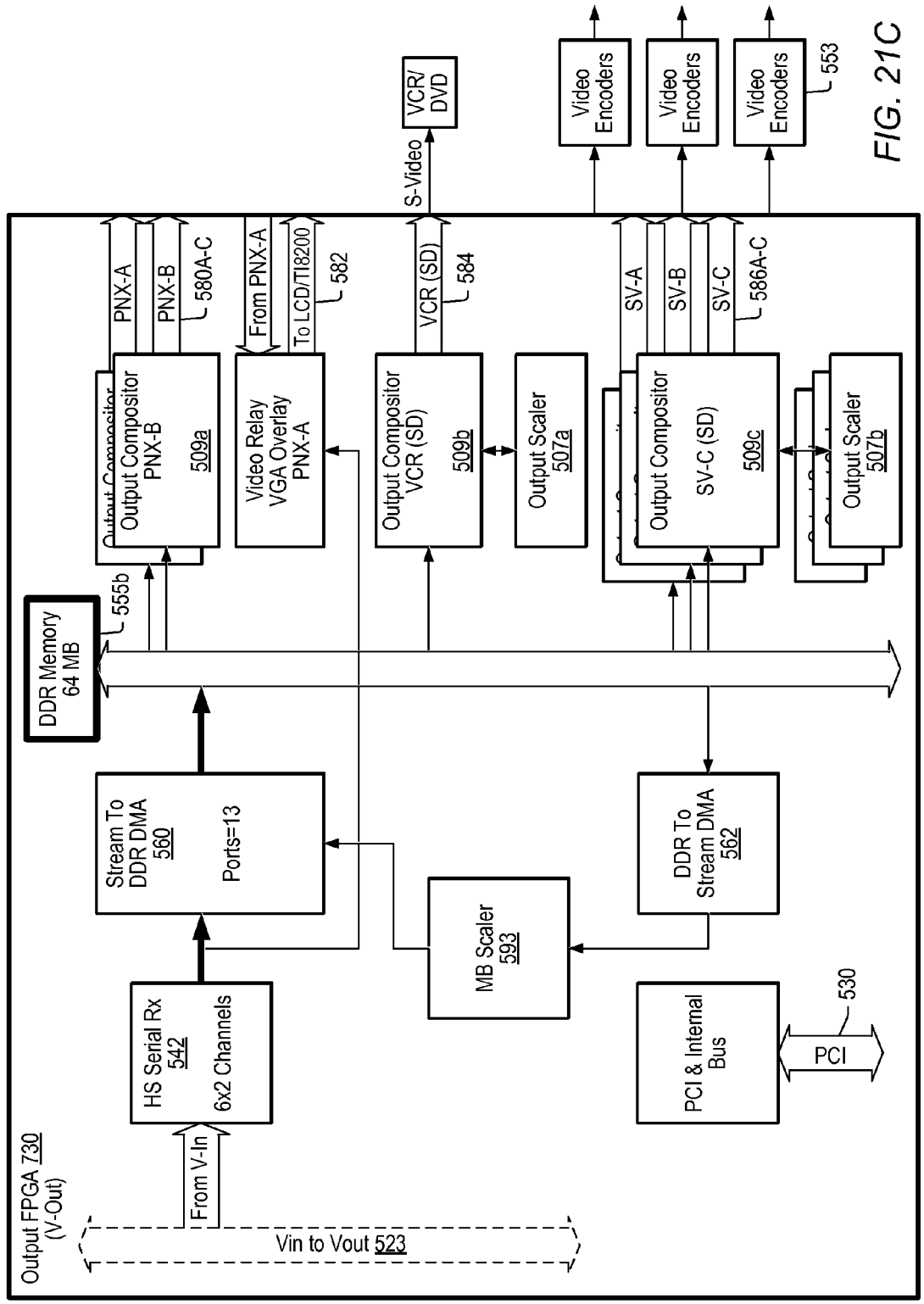

Referring now to FIGS. 21A-21C, exemplary embodiments of the FPGA hardware 402 are illustrated. In some embodiments, the FPGA hardware 402 may include two FPGA chips, referred to as input FPGA 720 (also referred to as the "V-In" chip) and output FPGA 730 (also referred to as the "V-Out" chip). FIG. 21A provides a high-level overview of an embodiment of components of the FPGA hardware 402.

FIG. 21B illustrates components of the input FPGA 720 in greater detail. Inputs 602, 606, 608, and 610 may receive video input signals from various sources. For example, inputs 602A and 602B may receive S-video input signals from local S-video sources (e.g., a document camera and a VCR or DVD player). Input 606 may receive a VGA input signal from a device such as a PC. Inputs 610 are primary camera inputs that may receive input signals from local cameras HB1 and HB2. For example, these cameras may provide video of the participants at the local endpoint. In some embodiments, the cameras may be high definition cameras. The input FPGA 720 may also interface with the video decoders 551. The video decoders 551 may receive remote video signals (e.g., over a network) and decode the remote video signals for input to the FPGA 720. The various video input signals are also referred to herein as "input streams". Input streams may be sent by various "TX" (transmit) modules and received by various "RX" (receive) modules.

As shown, the input FPGA 720 may include a pool of scalers 503. One or more of the input streams may be sent to the scalers 503 to change its resolution, e.g., to scale the resolution up or down. In some embodiments, the S-video input streams may be scaled up to a higher resolution, for example, so that they can be displayed at a larger size on the display screen. In some embodiments, the HB1 and HB2 primary camera input streams, which may be high definition video, may be scaled down by the scalers 502, e.g., to be sent to an S-video output (e.g., for output to a VCR).

After possibly being scaled up or down, the input streams may be serialized by the HS Serial TX module 540 and sent to the output FPGA 730.

FIG. 21C illustrates components of the output FPGA 730 in greater detail. The input streams coming from the input FPGA may be de-serialized by the HS Serial RX module 542 and then written into Double Data Rate (DDR) memory 555*b* by the Stream-to-DDR DMA (direct memory access) module 560.

As shown, the output FPGA 730 may include a memory-based (MB) scaler 593. In some embodiments, the MB scaler 593 may be operable to scale down the input streams for display in the live video icons. The DDR-to-Stream DMA module 562 may read the input streams from DDR memory 555*b* and feed them to the MB scaler 593. The MB scaler 593 may scale down the input streams to a low resolution for display in the icons, e.g., where the icons are displayed at a relatively small size with respect to the size of the display device screen.

The MB scaler 593 provides the scaled-down input streams to the DDR-to-Stream DMA module 562. Each of the scaled-down input streams may be written by the DDR-to-Stream DMA module 562 to a different location in the DDR memory 555*b* than the original input stream.

One or more composite images may be created from the input streams received from the input FPGA 720 and/or from the scaled-down input streams created by the MB scaler 593. For example, the output FPGA 730 may be operable to provide composite images on various outputs, such as the outputs 580, 582, 584, and 586. The outputs may be coupled to respective compositors 509, which may receive one or more of the input streams from the DDR memory 555*b* and may create a composite image suitable for the output type. For example, the compositor 509*b* may provide a composite image at S-video resolution on output 584 to an S-video output device, such as a DVD player or VCR.

Figure 21D:
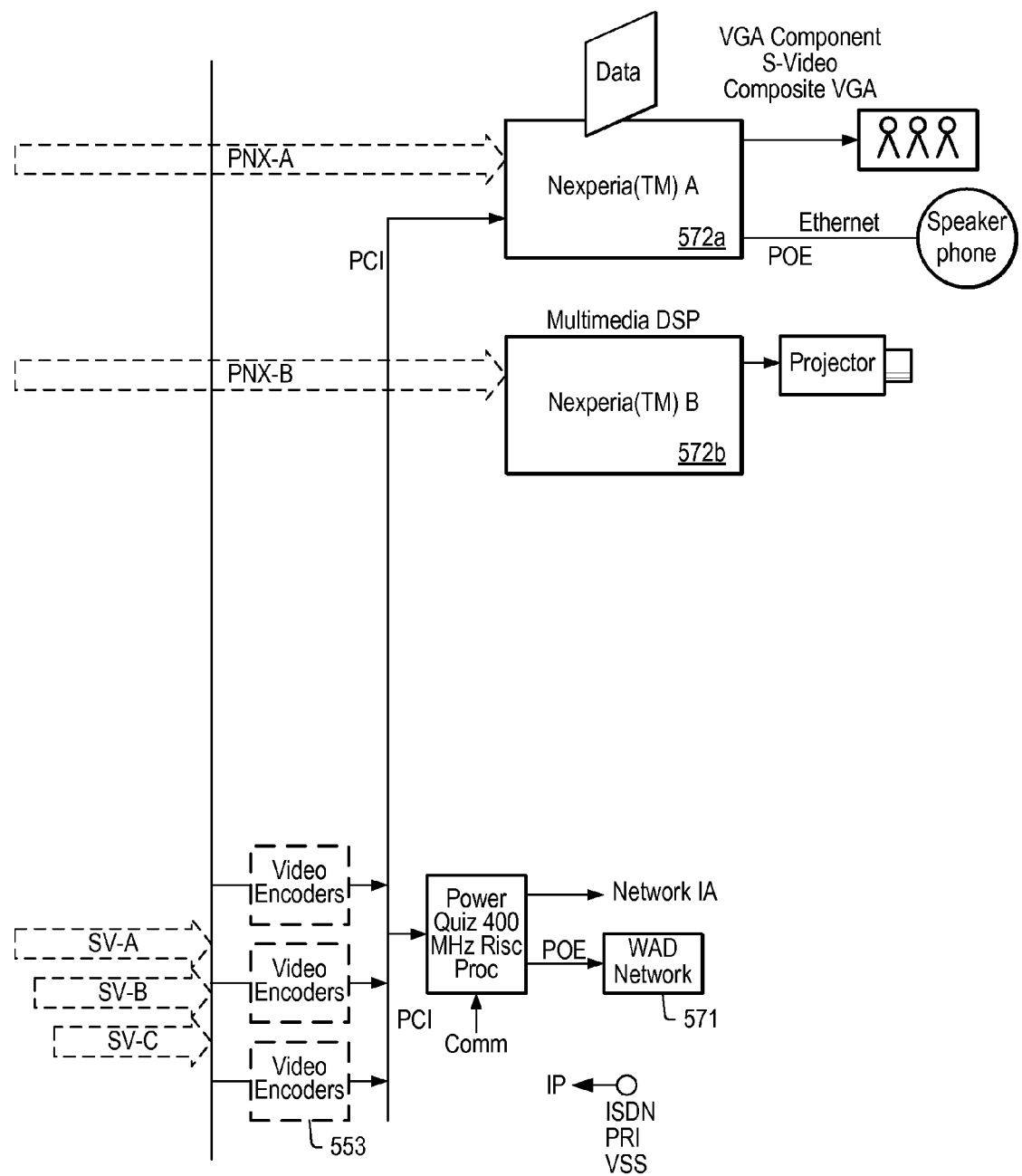

Outputs 586A-C may be coupled to video encoders 553. As illustrated in FIG. 21D, video encoders 553 may encode output signals from the output FPGA 730 and send them over a network (e.g., a Wide Area Network (WAN) Access Device (WAD) network 571). Multimedia Digital Signal Processing (DSP) processors (e.g., Nexperia™ processors 572) may be used to process audio (e.g., Phillips Nexperia™ (PNX) signals) and/or video signals (e.g., video signals from the Peripheral Component Interconnect (PCI) bus).

The compositors 509 may be configured by the application software 410. In other words, the application software 410 may control which input streams are included in each of the composite images, where the respective input streams are placed within the composite image, etc.

The input FPGA 720 and the output FPGA 730 may both be coupled to a bus, such as PCI bus 530, which may enable them to communicate with the processor 404, e.g., to receive instructions from the application software 410 through the driver software 408.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   receiving video information including a facial image of a first participant at a first endpoint in the videoconference, wherein the video information represents a scene at the first endpoint captured by a video camera;
   displaying the video information on a display screen at a second endpoint in the videoconference;
   analyzing the video information to locate the facial image of the first participant within the scene at the first endpoint; and
   performing a facial recognition algorithm on the video information to identify the first participant based on the facial image of the first participant.

2. The method of claim 1, further comprising:
   determining first participant information for the first participant in response to said identifying the first participant;
   displaying the first participant information for the first participant on the display screen at the second endpoint in the videoconference; and
   wherein said displaying the first participant information for the first participant on the display screen at the second endpoint in the videoconference enables participants at the second endpoint in the videoconference to see the first participant information for the first participant during the videoconference.

3. The method of claim 2, wherein the first participant information for the first participant comprises one or more of:
   a name of the first participant;
   a phone number of the first participant;
   an email address of the first participant;
   a business address of the first participant;
   a job title of the first participant; and/or
   an employer of the first participant.

4. The method of claim 1,
   wherein said displaying the video information on the display screen at the second endpoint in the videoconference is performed by a videoconferencing device at the second endpoint; and
   wherein said analyzing the video information and said performing the facial recognition algorithm are performed by the videoconferencing device at the second endpoint.

5. The method of claim 1,
   wherein said analyzing the video information, said performing the facial recognition algorithm, and said determining the first participant information are performed by a videoconferencing device at the first endpoint;
   wherein the method further comprises the videoconferencing device at the first endpoint sending the first participant information to a videoconferencing device at the second endpoint;

wherein said displaying the video information and said displaying the first participant information are performed by the videoconferencing device at the second endpoint.

6. The method of claim 1,
wherein said performing the facial recognition algorithm to identify the first participant based on the facial image of the first participant comprises:
analyzing the facial image of the first participant;
creating information characterizing the facial image of the first participant in response to said analyzing the facial image of the first participant;
determining a first data object specifying facial information that matches the information characterizing the facial image of the first participant, wherein the first data object identifies the first participant; and
wherein the first data object links the facial information to the first participant information.

7. The method of claim 6, wherein said determining the first data object specifying facial information that matches the information characterizing the facial image of the first participant comprises determining a database record specifying facial information that matches the information characterizing the facial image of the first participant, wherein the first database record identifies the first participant.

8. The method of claim 1,
wherein the video information further comprises a facial image of a second participant at the first endpoint in the videoconference;
wherein the method further comprises:
analyzing the video information to locate the facial image of the second participant;
performing the facial recognition algorithm to identify the second participant based on the facial image of the second participant;
determining second participant information for the second participant in response to said identifying the second participant; and
displaying the second participant information for the second participant on the display screen at the second endpoint in the videoconference;
wherein said displaying the first participant information for the first participant comprises displaying the first participant information proximally to the first participant;
wherein said displaying the second participant information for the second participant comprises displaying the second participant information proximally to the second participant.

9. The method of claim 8, further comprising:
tracking movement of the facial image of the first participant; and
re-positioning the first participant information for the first participant on the display screen to maintain proximity of the first participant information to the first participant in response to said tracking movement of the facial image of the first participant.

10. The method of claim 1, further comprising:
tracking movement of the facial image of the first participant; and
controlling a camera at the first endpoint in response to said tracking the movement of the facial image of the first participant to keep the facial image of the first participant within view of the camera.

11. A videoconferencing device, comprising:
an input port operable to receive video information, wherein the video information comprises a facial image of a first participant at a first endpoint in a videoconference, wherein the video information represents a scene at the first endpoint captured by a video camera;
one or more computational elements operable to:
analyze the video information to locate the facial image of the first participant within the scene at the first endpoint;
perform a facial recognition algorithm on the video information to identify the first participant based on the facial image of the first participant;
determine first participant information for the first participant in response to said identifying the first participant; and
create a composite video output signal operable to be used to display the first participant information with the video information;
wherein the videoconferencing device also includes an output port for displaying the composite video output signal.

12. The videoconferencing device of claim 11, wherein the first participant information for the first participant comprises one or more of:
a name of the first participant;
a phone number of the first participant;
an email address of the first participant;
a business address of the first participant;
a job title of the first participant; and/or
an employer of the first participant.

13. The videoconferencing device of claim 11,
wherein said performing the facial recognition algorithm to identify the first participant based on the facial image of the first participant comprises:
analyzing the facial image of the first participant;
creating information characterizing the facial image of the first participant in response to said analyzing the facial image of the first participant; and
determining a first data object specifying facial information that matches the information characterizing the facial image of the first participant, wherein the first data object identifies the first participant;
wherein the first data object links the facial information to the first participant information.

14. The videoconferencing device of claim 11,
wherein the video information also includes a facial image of a second participant at the first endpoint in the videoconference;
wherein the one or more computational elements are further operable to:
analyze the video information to locate the facial image of the second participant;
perform the facial recognition algorithm to identify the second participant based on the facial image of the second participant;
determine second participant information for the second participant in response to said identifying the second participant;
combine the second participant information with the video information in the composite video output signal;
wherein the one or more computational elements combine the first participant information for the first participant to be displayed proximally to the first participant; and
wherein the one or more computational elements combine the second participant information with the second participant to be displayed proximally to the second participant.

15. The videoconferencing device of claim 14,
wherein the one or more computational elements are further operable to:
- track movement of the facial image of the first participant; and
- re-position the first participant information for the first participant within the composite output signal to maintain proximity of the first participant information to the first participant in response to said tracking movement of the facial image of the first participant.

16. A computer-readable storage medium, comprising program instructions, wherein the program instructions are computer-executable to:
- receive video information including a facial image of a first participant at a first endpoint in a videoconference, wherein the video information represents a scene at the first endpoint captured by a video camera;
- display the video information on a display screen at a second endpoint in the videoconference;
- analyze the video information to locate the facial image of the first participant within the scene at the first endpoint; and
- perform a facial recognition algorithm on the video information to identify the first participant based on the facial image of the first participant.

17. The computer-readable storage medium of claim 16, wherein the program instructions are further executable to:
- determine first participant information for the first participant in response to said identifying the first participant;
- display the first participant information for the first participant on the display screen at the second endpoint in the videoconference; and
- wherein said displaying the first participant information for the first participant on the display screen at the second endpoint in the videoconference enables participants at the second endpoint in the videoconference to see the first participant information for the first participant during the videoconference.

18. The computer-readable storage medium of claim 16, wherein the first participant information for the first participant comprises one or more of:
- a name of the first participant;
- a phone number of the first participant;
- an email address of the first participant;
- a business address of the first participant;
- a job title of the first participant; and/or
- an employer of the first participant.

19. The computer-readable storage medium of claim 16,
- wherein said displaying the video information on the display screen at the second endpoint in the videoconference is performed by a videoconferencing device at the second endpoint; and
- wherein said analyzing the video information and said performing the facial recognition algorithm are performed by the videoconferencing device at the second endpoint.

20. The computer-readable storage medium of claim 16,
- wherein said analyzing the video information, said performing the facial recognition algorithm, and said determining the first participant information are performed by a videoconferencing device at the first endpoint;
- wherein the method further comprises the videoconferencing device at the first endpoint sending the first participant information to a videoconferencing device at the second endpoint;
- wherein said displaying the video information and said displaying the first participant information are performed by the videoconferencing device at the second endpoint.

21. The computer-readable storage medium of claim 20, wherein said determining the first data object specifying facial information that matches the information characterizing the facial image of the first participant comprises determining a database record specifying facial information that matches the information characterizing the facial image of the first participant, wherein the first database record identifies the first participant.

* * * * *